(12) United States Patent
Johnston et al.

(10) Patent No.: US 6,791,531 B1
(45) Date of Patent: Sep. 14, 2004

(54) DEVICE AND METHOD FOR CURSOR MOTION CONTROL CALIBRATION AND OBJECT SELECTION

(75) Inventors: Richard S. Johnston, Sammamish, WA (US); Steven S. Hubbard, Seattle, WA (US); Charles D. Melville, Issaquah, WA (US)

(73) Assignee: Dot On, Inc., La Jolla, CA (US)

( * ) Notice: Subject to any disclaimer, the term of this patent is extended or adjusted under 35 U.S.C. 154(b) by 272 days.

(21) Appl. No.: 09/590,658

(22) Filed: Jun. 7, 2000

Related U.S. Application Data

(60) Provisional application No. 60/137,892, filed on Jun. 7, 1999, provisional application No. 60/137,893, filed on Jun. 7, 1999, and provisional application No. 60/151,443, filed on Aug. 30, 1999.

(51) Int. Cl.[7] ............................................... G09G 5/08
(52) U.S. Cl. ..................................... 345/157; 345/158
(58) Field of Search ............................... 345/156, 157, 345/158, 168, 173, 174, 175, 179; 178/18.01–18.11; 341/22; 250/221

(56) References Cited

U.S. PATENT DOCUMENTS

| | | | |
|---|---|---|---|
| 3,986,030 A | 10/1976 | Teltscher | 250/349 |
| 4,109,145 A | 8/1978 | Graf | 250/201 |
| 4,886,941 A | 12/1989 | Davis et al. | 178/18 |
| 4,891,630 A | 1/1990 | Friedman et al. | 340/706 |
| 5,168,531 A * | 12/1992 | Sigel | 382/48 |
| 5,325,133 A | 6/1994 | Adachi | 351/209 |
| 5,327,161 A | 7/1994 | Logan et al. | 345/157 |
| 5,504,501 A * | 4/1996 | Hauck et al. | 345/158 |
| 5,686,942 A * | 11/1997 | Ball | 345/158 |
| 5,832,139 A | 11/1998 | Batterman et al. | 382/291 |
| 5,854,621 A | 12/1998 | Junod et al. | 345/158 |
| 5,856,844 A | 1/1999 | Batterman et al. | 348/207 |
| 5,864,334 A * | 1/1999 | Sellers | 345/168 |
| 5,900,863 A * | 5/1999 | Numazaki | 345/158 |
| 6,184,863 B1 * | 2/2001 | Sibert et al. | 345/156 |
| 6,281,878 B1 * | 8/2001 | Montellese | 345/156 |

OTHER PUBLICATIONS

Provisional Patent Application No. 60/202,512, entitled *A Fast Algorithm for Tracking Objects in an Image*, filed in the name of Richard S. Johnston on May 5, 2000.

\* cited by examiner

*Primary Examiner*—Dennis-Doon Chow
(74) *Attorney, Agent, or Firm*—Charles J. Rupnick

(57) ABSTRACT

A device and method for cursor motion control, calibration of the motion control, and object selection and computer command input.

39 Claims, 10 Drawing Sheets

DEVICE AND METHOD FOR CURSOR MOTION CONTROL CALIBRATION AND OBJECT SELECTION

This application claims the benefit of each of U.S. Provisional Application Ser. No. 60/137,892, filed in the names of Richard S. Johnston, Charles D. Melville, Harold M. Kutz, and Robert G. Snook on Jun. 7, 1999; U.S. Provisional Application Ser. No. 60/137,893, filed in the names of Richard S. Johnston, Robert G. Snook, and Steven S. Hubbard on Jun. 7, 1999; and U.S. Provisional Application Ser. No. 60/151,493, filed in the names of Richard S. Johnston, Charles D. Melville, Robert G. Snook, and Steven S. Hubbard on Aug. 30, 1999, the complete disclosures of which are incorporated herein by reference.

FIELD OF THE INVENTION

Control of motion of an on-screen cursor, calibration of the motion control, and object selection using an on-screen cursor, in particular, passive remote control of on-screen cursor motion, including absolute position cursor calibration and on-screen object selection.

BACKGROUND OF THE INVENTION

Input devices for cursor motion control and object selection on a computer screen are well known in the art. U.S. Pat. No. 4,886,941, entitled CIRCUIT FOR INTERFACING MOUSE INPUT DEVICE TO COMPUTER SYSTEM, issued to Davis et al on Dec. 12, 1989, the complete disclosure of which is incorporated herein by reference, for example, discloses a method for changing information from a motion sensor into quadrature signals for interfacing a mouse input device to a computer system via a channel designed to accept potentiometer-derived inputs. The inputs are typically transmitted via a hardwired electrical connection or a radio link, as disclosed in U.S. Pat. No. 5,854,621, entitled WIRELESS MOUSE, issued to Junod, et al on Dec. 29, 1998, the complete disclosure of which is incorporated herein by reference. The inputs control X-Y position signals for locating a cursor on the computer's display screen, for example, to interface with "mouse-icon" user graphics, whereby the user moves the cursor to on-screen locations associated with user programs and commands. The "mouse" is a form of hand-manipulated motion sensor very commonly used for cursor control. Other hand-manipulated motion sensors generally well known in the art include the "track ball" mouse and the "joy stick," examples of which are found on many laptop computers. Also well known is the requirement of hand manipulation of the mouse, track ball and joy stick to generate the motion signals that control the cursor location.

Each of these hand-manipulated motion sensors require that the user's hand disengage from the keyboard, find the mouse, track ball or joystick, move the cursor, select the object, then reengage the keyboard. This sequence requires time and effort, especially in applications where both the keyboard and pointing are used extensively. The standard mouse also requires a significant amount flat, horizontal space to operate, and the moving parts are sensitive to dust and dirt, which interferes with precise control of the cursor.

One alternative hand-manipulated motion sensor is the "touchpad," also found on many laptop computers. As disclosed by U.S. Pat. No. 5,327,161, entitled SYSTEM AND METHOD FOR EMULATING A MOUSE INPUT DEVICE WITH A TOUCHPAD INPUT DEVICE, issued to Logan, et al on Jul. 5, 1994, the complete disclosure of which is incorporated herein by reference, the touchpad is a mouse-emulating input device having a drag switch in which the direction of movement of touch across the touchpad surface causes a display cursor to move in the same relative direction as the movement of touch across the surface. While the touchpad overcomes some of the limitations of the standard mouse, the touchpad, like the small joysticks found on laptop computers, do not provide the precise cursor control or ease of movement normally desired by users. Furthermore, each of these cursor control methods is counter-intuitive: the body motion used to direct the device, and through it the cursor, is one not normally used to "point" at an object. Rather, the user must move in a horizontal plane of motion that is rotated 90 degrees to the typical vertical plane of the display screen. This plane rotation requires a learning curve for the user. The typical user, for example, is not able to write words in a drawing program with a hand-manipulated device as well as by using a pen or pencil on paper.

Another problem with conventional hand-manipulated motion sensors is the manner of cursor positioning relative to the computer screen. According to this relative cursor positioning, physical motion of the mouse, or movement of touch across the touchpad surface, causes a responsive software application to move the cursor on the display screen in a direction consistent with the mouse or touch motion. When the mouse runs off of its friction pad or into an obstacle on the work surface or to the extent of the operator's reach, the relative position of the mouse to the cursor must be reset, or "re-centered," by lifting and repositioning the mouse on the friction pad. In a touchpad, when the operator's digit moving across the touchpad reaches the limit of the touchpad's surface, the relative position of the operator's digit to the cursor must be similarly re-centered by lifting and repositioning the digit on the touchpad. In a mouse, this re-centering operation requires additional operator manipulation, while in a touchpad, re-centering increases the difficulty of the operator's task in controlling the cursor.

Alternatively to conventional hand-manipulated motion sensors, optical cursor control systems are known that simplify manipulation of the cursor. In particular, eye-tracking devices, or "oculometers," are known that provide cursor manipulation by tracking eye movement. U.S. Pat. No. 4,109,145, entitled APPARATUS BEING CONTROLLED BY MOVEMENT OF THE EYE, issued to Graf on Aug. 22, 1978; U.S. Pat. No. 3,986,030, entitled EYE-MOTION OPERABLE KEYBOARD-ACCESSORY, issued to Teltscher on Oct. 12, 1976; and U.S. Pat. No. 5,325,133, entitled DEVICE FOR MEASURING A RETINA REFLECTED LIGHT AMOUNT AND A GAZE DETECTING apparatus using the same, issued to Adachi on Jun. 28, 1994, the complete disclosures of which are incorporated herein by reference, each disclose oculometers using light reflected from the user's eye to produce signals representative of viewing direction. The eye tracker trains a camera on an eye to measure its movement, thereby detecting the direction an eye is gazing. Each of the above referenced and other known oculometers are limited by the amount of reflected light from the user's eye.

As described in U.S. Pat. No. 4,891,630, entitled COMPUTER VISION SYSTEM WITH IMPROVED OBJECT ORIENTATION TECHNIQUE, issued to Friedman, et al on Jan. 2, 1990, the complete disclosure of which is incorporated herein by reference, two major drawbacks to the oculometer or eye tracking systems of the prior art are the field of view sensitivity and depth of field sensitivity. Field of view sensitivity requires the user to maintain a relatively constant position relative to the system's optical axis, i.e., in line with the sensors, so that the user's eye can be viewed. Depth of field sensitivity requires the user to maintain a constant position along the optical axis, i.e., a constant distance from the sensors, to remain in focus. Typically, the eye tracker uses the position of the corneal reflection relative to the center of the pupil to determine eye gaze location. However, because the pupil is very dark, lenses with a low "f" number have been used resulting in an eye tracker system with a small depth of field. Therefore, the user must keep the eye constantly in an unchanging position for the eye to remain in focus so that the eye tracking equipment can function effectively. Maximizing the depth of the field of view allows the user to move to various positions along the optical axis. One technique for improving the depth of the field is to use an automatic focusing lens, for example, a lens that will mechanically move in order to focus the image of objects at various depths along the optical axis. Alternatively, a fixed focus lens system is used to focus on an image of the user's eye at only one depth. The depth of field inherent in the fixed focus system is maximized by increasing the brightness of the light reflected off the user's eye.

U.S. Pat. No. 4,891,630 discloses a body pointing system that is combined with the eye tracker. Accordingly, U.S. Pat. No. 4,891,630 discloses a non-reflective, planar "orientation and position patch" having at least three coplanar and non-collinear reflective spots A, B, and C, and a curved reflector D. The motion control device also includes a solid-state light-sensitive image sensor capable of generating a two-dimensional digital representation of the image stored in an array of memory cells arranged in multiple rows and columns. The cells each have an associated row and column address and the information at each cell is available for reading. Light from a source fixed relative to the sensor is directed onto the orientation and position patch, which is attached to an object, such as a human head or finger or an inanimate object. A lens fixed relative to the sensor defines an optical axis extending through the center of the lens and intersecting the image sensor near its center. The lens focuses a reflected light image of the object, including an image of the orientation and position patch, upon the image sensor.

The system further requires a computer having a processor and main memory and the capability for reading the row and column addresses of memory cells corresponding to the images A', B', and C' of reflective spots A, B, and C and an image DLS of the light reflected from the curved reflector D, thereby developing a binary image of each image. A task stored in the computer memory detects and quantifies changes in orientation and position of that surface of the object upon which the orientation and position patch is secured. The task detects changes in the position along the optical axis and in directions perpendicular thereto by computing changes in the row and column addresses of images A', B', and C'. The task also detects rotational changes about axes perpendicular to the optical axis by computing differences in the row and column addresses of the image DLS and the images A', B', and/or C'.

An eye tracking device is formed when the orientation and position patch is fixed on a user's face in relative proximity to the user's eye. A reflected light image of the eye formed by the lens upon the image sensor is analyzed to determine the direction of gaze by detecting the position of the corneal reflection relative to the position of the head. The position of the corneal reflection CR is correlated to the position being gazed upon. Head orientation is computed from a view of the reflective spots on the patch and the corneal reflection CR. The image processing hardware and software extracts the reflections from a single camera image and computes the x and y positions of the center of each reflection. Software operated by the microprocessor reads the locations of edges in the binary images from memory, performs a standard, binary image region connectivity analysis, and computes x and y centers for each image. Regions representing the patch reflections and the corneal reflection are selected and labeled. The x and y differences between the centers of regions that are necessary to compute the user's head orientation and point of gaze are then computed.

A two-position calibration sequence in necessary when the eye tracker is engaged. The user, wearing the reflective patch beneath the eye, sits in front of the camera lens. First, the user looks at a top left selection position and second, at a bottom right selection position. After this calibration, a position on the front panel of the device are selected by directing the user's gaze at it. The computer uses the position of the corneal reflection relative to the reflective patch to compute head position and orientation changes. However, if the user moves outside the field of the camera lens, no means is provided for retaining the calibration information so that the calibration sequence must be repeated in whole. Furthermore, the above described need to focus light on the user's eye and obtain the reflected image severely limit the useful field of view and depth of field of the oculometer eye tracker systems.

Thus, cursor control systems have been developed that use a photo sensor to optically track the image of small reflective or emissive targets fixed relative to the user, usually attached to the head. Position information derived from the emitted or reflected light images controls the movement of a cursor on a computer or other system's display screen, thereby performing cursor motion control functions normally associated with a hand or eye-manipulated device. Attached to the user's head, the target device becomes a "head tracker," as described in U.S. Pat. No. 4,891,630. When the head moves, a responsive software command moves the cursor from its last position in a direction consistent with the head motion. Thus, like the mouse and other hand-manipulated cursor control devices, the head tracker also requires body motion to direct the device, and through it the cursor, that is not normally use to "point" at an object. Unlike the oculometer "eye tracker" systems, rather than just the eye, the user must move the entire head to point. This head motion requires a learning curve for the user. The typical user, for example, is not able to write words in a drawing program with a hand-manipulated device as well as by using a pen or pencil on paper.

While relative cursor motion by sensing of a remote target is thus provided in the prior art, there remains the need to interact with the software application by making a selection and indicating this choice to the operating software application. Motion of the cursor on the display screen does not normally accomplish this task. In other words, mere cursor motion control does not provide a method of selecting an object. Rather, additional circuits and software must be present to perform the selection process. Typically, the selection process is performed using a mouse by the user depressing or "clicking" the mouse buttons to activate this additional circuitry which is integral with the cursor motion control in the mouse. The additional circuitry in turn transmits control command signals to the control software which is typically resident on the computer. Prior art methods for performing this selection or "clicking" task include time based selection in which a click is assumed if the cursor is stationary, or dwells, over an object for a predetermined period of time. For example, U.S. Pat. No. 4,891,630 discloses an oculometer or eye tracker system wherein selection is made when the cursor dwells over the selection. Alternatively, a separate cable controlled cursor is used to transmit the one or more necessary commands.

Selection or activation of a software application often requires additional clicks performed in rapid sequence. Many current mouse designs include additional integral circuitry for "double clicking" whereby the rapid sequence of additional clicks is provided in a single motion by the user depressing or "clicking" a second mouse button to activate this additional circuitry. Additionally, separate roller switch-controlled circuitry provides a "scrolling" function. One such example is the MouseMan® model M-CW47 available from Logitech of Fremont, Calif.

SUMMARY OF THE INVENTION

The present invention overcomes the cursor control limitations of the prior art by providing an optical device for tracking a remote object. The device of the invention includes an optical sensor formed of a number of photosensitive pixels arraigned in a two-dimensional array of rows and columns; an imaging lens arranged to image onto the optical sensor a cursor control object positioned within the field of view and the depth of field of the imaging lens; and an interface circuit coupled to the optical sensor for a) determining position information describing position of the cursor control object image relative to the two-dimensional array of pixels, and b) producing cursor control signals suitable for controlling the position of a cursor on a computer-controlled display as a function of the control object image position information.

According to one aspect of the invention, the optical tracking device also includes an infrared radiation source essentially collocated with the imaging lens and directing infrared radiation into at least a portion of the field of view of the imaging lens. Thus, the cursor control object is illuminated by the infrared radiation, and the imaging lens images reflected infrared radiation from the illuminated cursor control object onto the optical sensor.

According to one aspect of the invention, the cursor control object is a digit of the user's hand. The user's digit either relies upon the natural reflectivity of the user's skin or is augmented with an attached reflecting device. In a vertical finger pointing mode, the user moves the digit, with or without augmentation, within the field of view of the imaging lens. The motion of the digit is translated into cursor motion on a display screen when the radiation reflected from the digit is imaged onto the optical sensor and converted into an electrical video signal by the interface circuit, which is interpreted by a conventional cursor motion control function implemented in a software program and operated on a processor interfaced to the display screen. The control motion practiced by the user is a natural pointing motion, preferably using the index finger of either hand. Furthermore, when practiced in combination with a standard computer keyboard, the cursor control motion is accomplished without disengaging the hands from the keyboard.

According to another aspect of the invention, when practiced in a horizontal finger pointing mode, the radiation sources and imaging lens are located on a surface of the keyboard, and the digit control motion is to that used with a standard touchpad. But the cursor control is accomplished without touching any surface.

According to other aspects of the invention, the interface circuit includes one or more filters for implementing signal thresholds to distinguish object images that have an intensity above a predetermined threshold intensity. Also, the circuit includes circuitry for each of determining connectivity between the various pixels determined to have an intensity above the predetermined threshold intensity, determining connectivity between the pixels, determining a centroid of each object image, and generating output signals representative of the position of the centroid of each object image relative to the array of photosensitive pixels of the optical sensor.

According to other aspects of the invention, the invention provides a signal processing function implemented in software for operation on a processor, the signal processing function is electrically coupled to receive the output signals representative of the position of the centroid of each object image relative to the optical sensor and determines one control object image among one or more of the object images. The processor also operates one or more elimination algorithms in determining one control object image among multiple object images. Furthermore, the processor operates a function implemented in software for determining one control object image among the object images as a function of the physical arrangement of the user's digit or digits relative to the field of view of the imaging lens. According to still other aspects of the invention, the processor also operates a function implemented in software for identifying one of the object images appearing closest to a predetermined edge of the optical sensor in order to determine the control object image.

According to another aspect of the invention, the invention includes a cursor motion control function implemented in software for operation on a processor, the cursor motion control function responding to an output signal of the signal processing function representative of the position of the centroid of the control object image relative to the array of photosensitive pixels of the optical sensor for controlling a position of a cursor relative to a display screen.

According to still other aspects of the invention, the invention provides a clicking function implemented in software for operation on a processor, the clicking function of the invention generates a signal imitating a conventional mouse click signal in response to a change in the control object image. According to various aspects of the invention, the change in the control object image is any one or a combination of: a) motion of the control object image in predetermined pattern; and b) a change in the quantity of images having an intensity above the predetermined threshold intensity, including i) a reduction in the intensity of the control object image to less than the predetermined threshold intensity during a predetermined term followed by a restoration of the intensity above the threshold in essentially the same position relative to the optical sensor, i.e. a momentary flashing "off" of the image; and ii) a momentary appearance of one or more additional object images having an intensity above the threshold in essentially a predetermined position relative to the control object image.

According to yet another aspect of the invention, the cursor calibration limitations of the prior art are overcome by the present invention by providing a calibration sequence function implemented in software for operation on a processor. The calibration sequence function determines a current position of the control object relative to the array of pixels of the optical sensor, and maps the pixel containing the centroid of the control object image onto a predetermined pixel of the display screen. Preferably, the calibration sequence function maps the centroid of the control object image to a pixel at the approximate center of the display screen.

According to a further aspect of the invention, the calibration sequence function responds to an input signal, for example, a mouse click signal, indicating an instant at which to determine the current position of the control object relative to the optical sensor, whereby the user is able to select the desired physical position of the cursor control object in space relative to the imaging lens.

According to another aspect of the invention, the calibration sequence function also defines a relationship between the amount of spatial movement of the control object relative to the optical sensor and the cursor motion on the display screen. The relationship is defined either by a default setting in the implementation software or a user selected setting.

According to other aspects of the invention, the cursor control object is a source of electromagnetic radiation positioned within the field of view of and remotely from the imaging lens. Emitted radiation from the cursor control object is directed into the imaging lens and preferably forms an object image on the two-dimensional array of photosensitive pixels forming the optical sensor. The object image having an intensity above the predetermined threshold intensity. A centering function implemented in software for operation on a processor determines a current position of the object image relative to the array of pixels of the optical sensor and maps the pixel containing a centroid of the object image to a predetermined pixel of the computer-controlled display screen. Preferably, the centering function maps the pixel containing a centroid of the object image to a pixel at the approximate center of the display screen. According to one aspect of the invention, the invention further includes a cursor motion control function implemented in software for operation on a processor, the cursor motion control function responds to an output signal of the centering function representative of the position of the centroid of the object image relative to the array of photosensitive pixels of the optical sensor to control the cursor's position relative to the display screen. According to another aspect of the invention, the invention further includes a clicking function implemented in software for operation on a processor, the clicking function generates a signal imitating a mouse click signal in response to a change in the object image. For example, the imitation mouse click signal is generated when a steady radiation emission is interrupted for a predetermined minimum term.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
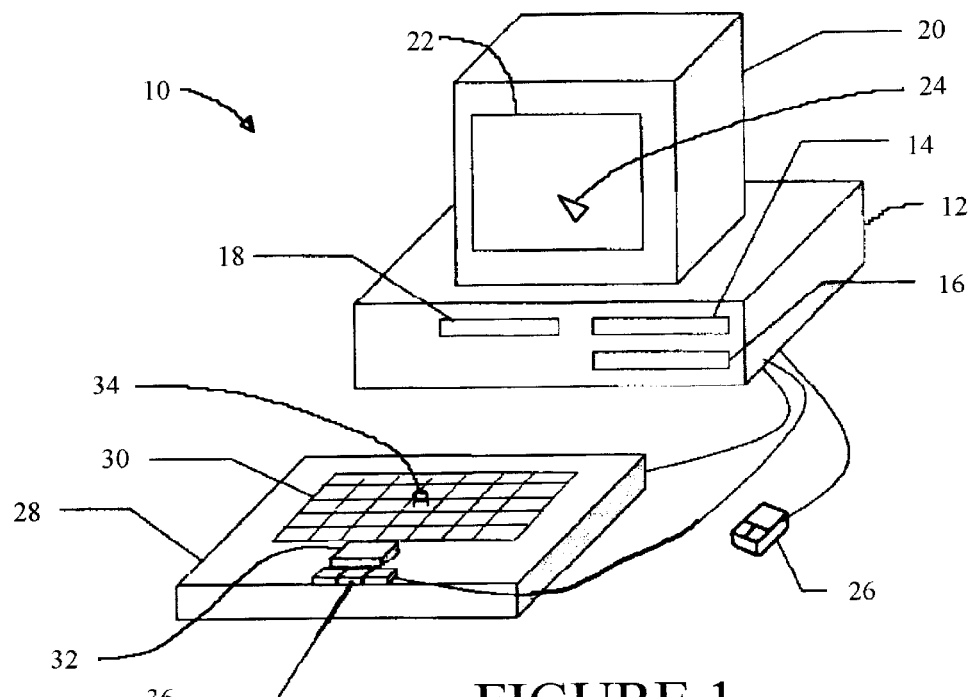
FIG. 1 illustrates a generally conventional personal computer suitable for use in practicing the present invention.

FIG. 1 illustrates a generally conventional personal computer suitable for use in practicing the present invention. Alternatively, the present invention is practiced using a portable computer or a workstation coupled to a network and a server; various console and video games; various office and industrial equipment control systems; and various keyboard-less "information appliances." Practiced using "information appliances," the invention replaces keys, push buttons, and/or touch screens.

Personal computer 10 shown in FIG. 1 typically includes a processor chassis 12 in which are mounted a floppy disk drive 14 suitable for reading and writing data from and to a floppy disk (not shown), a hard drive 16 suitable for non-volatile storage and executable programs, a motherboard populated with appropriate integrated circuits (not shown), and a power supply (not shown), all generally well known in the art. Personal computer 10 also optionally includes a compact disk-read only memory (CD-ROM) drive 18 into which a CD-ROM disk (not shown) may be inserted so that executable files and data on the disk can be read for transfer into the memory and/or storage on hard drive 16 of personal computer 10. A monitor 20 is included for displaying on a screen 22 graphics and text generated when an executable program is run on the personal computer and for use with the present invention, for displaying a cursor 24. A conventional laptop computer (not shown) is typically similarly equipped with either integral or peripheral devices.

Control input for cursor 24 is provided to personal computer 10 using a cursor control device, such as a mouse 26, a keyboard 28 with one or more of keys 30 having a cursor control function, or another suitable pointing device.

Optionally, the cursor control device is a head tracker (not shown), as disclosed in U.S. Pat. No. 4,891,630; an oculometer eye tracker (not shown), as disclosed in any of U.S. Pat. No. 4,109,145, U.S. Pat. No. 3,986,030, U.S. Pat. No. 5,325,133, and U.S. Pat. No. 4,891,630; or one of the other known optically tracking cursor control systems (not shown). The cursor control device is interfaced to the computer via a standard port, such as a Universal Serial Bus (USB), mouse port, serial interface or another suitable port, on processor chassis 12. Signals from the cursor control device are conveyed to the motherboard to control cursor 24 on display screen 22. In a laptop or a notebook configuration, computer 10 optionally includes a touchpad 32 or a joystick 34 for controlling cursor 24.

Typically, laptop or notebook computer 10 includes an integral "clicker" switch pad 36 formed of one or more keys mounted on computer keyboard 28. Personal computer 10 also includes an accessory "clicker" switch pad 36 mounted on computer keyboard 28.

Figure 2:
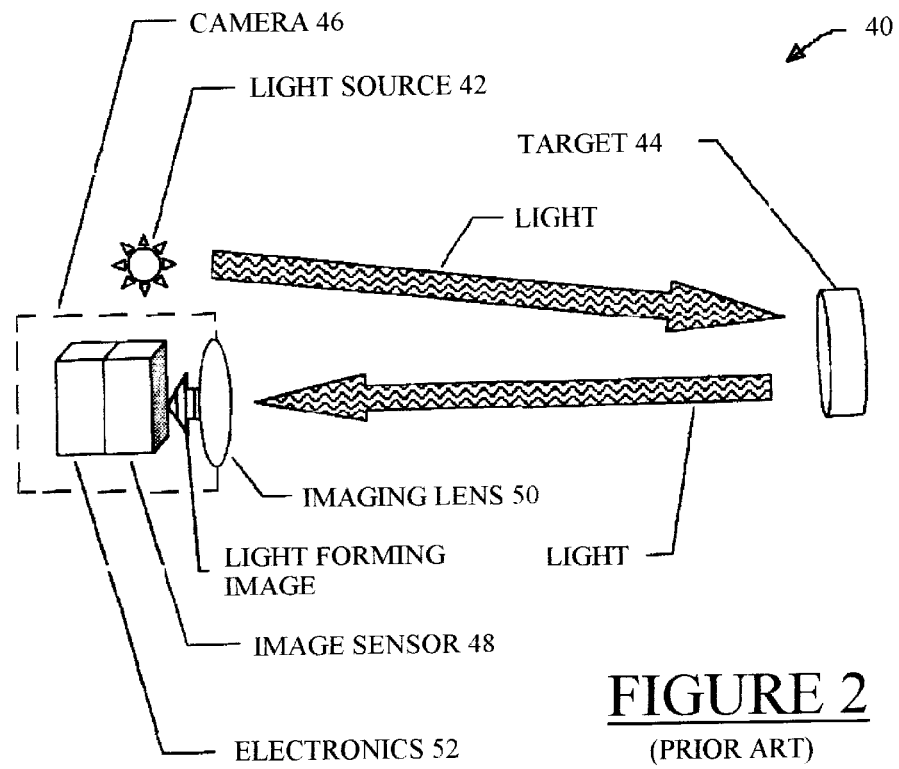
FIG. 2 illustrates the function of an optical cursor control system.

FIG. 2 illustrates an optical cursor control system, a known alternative to conventional hand-manipulated motion sensors. Optical cursor control system 40, or "optical tracker," includes a light source 42 for illuminating one or more reflectors 44 located within field of view of a camera 46. As described in each of U.S. Pat. No. 5,832,139, entitled METHOD AND APPARATUS FOR DETERMINING DEGREES OF FREEDOM OF A CAMERA, issued to Batterman, et al on Nov. 3, 1998, and U.S. Pat. No. 5,856,844, entitled METHOD AND APPARATUS FOR DETERMINING POSITION AND ORIENTATION, issued to Batterman, et al on Jan. 5, 1999, the complete disclosures of which are incorporated herein by reference, light source 42 is any device for generating electromagnetic radiation, which is either visible or non-visible. For example, non-visible infrared emitting sources, such as infrared light emitting diodes, reduce distraction of a human user. These sources are nearly monochromatic, i.e. their emissions are confined to a relatively narrow band of wavelengths. Therefore, ambient light, which tends to be wide band, may be attenuated by filters, while target illumination light is passed.

Light from source 42 is directed toward a reflective target 44. As illustrated in FIG. 2, target 44 is a passive target that does not provide its own illumination. Alternatively, target 44 is an active target that emits light, i.e. an alternative to light source 42. Reflected or emitted light from target 44 is directed toward camera 46. Camera 46 is a typical electronic video camera, consisting of an image sensor 48, an optical imaging lens 50 for focusing light from target 44 onto image sensor 48, and electronics 52 for converting the image incident on sensor 48 to an electrical video signal. Electronics 52 interface camera 46 to a processor 12 (shown in FIG. 1) via a standard video interface, where the data is digitized and stored in an image capture board with a frame buffer memory port. Motion of target 44 within the field of view of camera 46 is translated into relative movement of the computer's on-screen cursor by any of several conventional and commonly known relative cursor positioning techniques similar to those mentioned above for positioning the cursor relative to the physical motion of a mouse Cursor motion control is typically implemented on a computer in a software program.

The present invention is a device and method for cursor motion control, calibration of the motion control, and object selection and computer command input.

Cursor Motion Control

Figure 3:
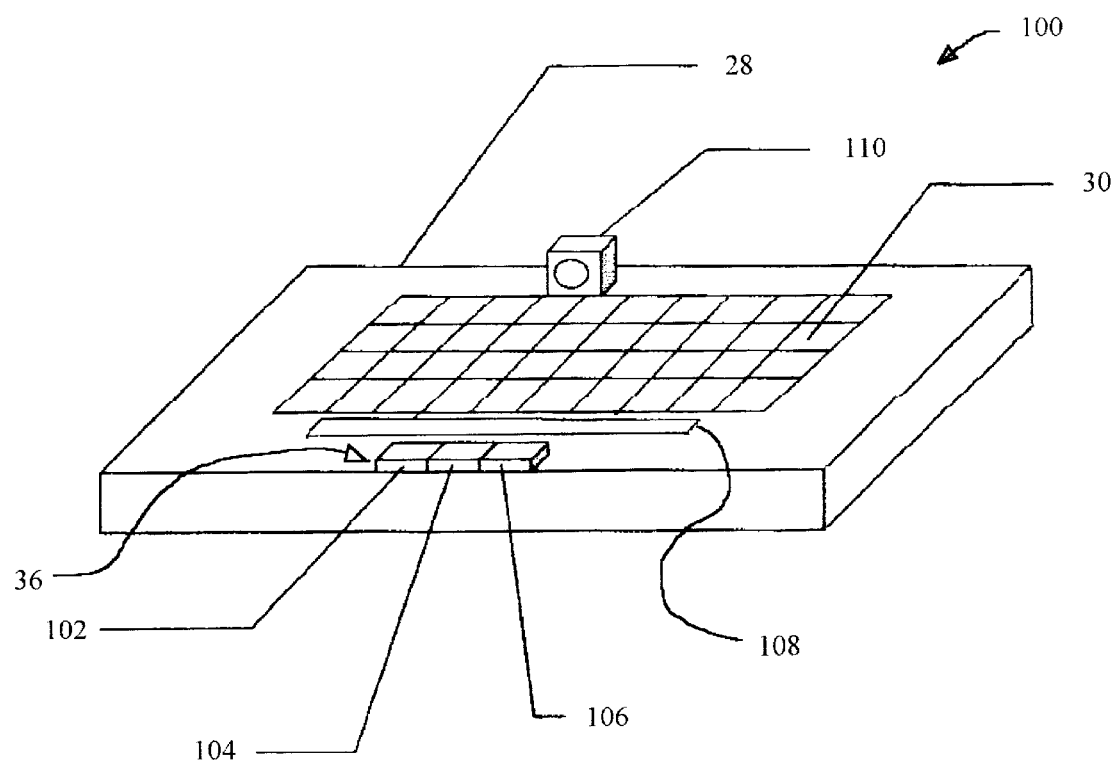
FIG. 3 illustrates the horizontal finger-pointing cursor control system of the invention for interacting with software applications operated by a conventional computer system, such as the personal computer illustrated in FIG. 1.

FIG. 3 illustrates the horizontal finger-pointing cursor control system 100 of the invention for interacting with software applications operated by a conventional computer system, such as personal computer 10 illustrated in FIG. 1. The elements of the horizontal finger-pointing cursor control system 100 implement functions that are generally consistent with the steps of the various methods described herein.

In FIG. 3, keyboard 28 is shown with either an integral or accessory optical tracking system 110, and either integral or accessory "clicker" switch pad 36 formed of one or more "clicker" keys 102, 104, and 106. Clicker keys 102, 104, and 106 are actuated by momentarily depressing or "tapping," for example, using the digits of the hand. Preferably, positioned just below the "space bar" 108 on a conventional keyboard, clicker keys 102, 104, and 106 are easily reached by the user's thumbs in a slightly exaggerated space bar-depression motion, without removing the hands from proper typing position relative to keyboard 28. A variety of functions can be optionally assigned to clicker keys 102, 104, and 106. For example, left key 102 is preferably assigned special system functions, such as a single click functions to freeze or unfreeze cursor 24, click and hold down functions to switch cursor 24 motion to high resolution mode, and a double click functions to center cursor 24 relative to display screen 22. Another clicker key 106, for example, is assigned conventional mouse tasks, such as click and hold down functions within certain applications to collect screen objects while cursor 24 is moved or to select a function associated with a screen icon, and a double click functions to select applications associated with a screen icon. Optionally, another clicker key 104 is assigned the mouse double click functions. Alternatively, clicker keys 104, 106 are assigned typical left, right click mouse functions.

According to a preferred embodiment of the invention, the optically tracking cursor control device 110 is configured as a horizontal optical finger-pointing cursor control system 100, as described herein. Optically tracking cursor control device 110 is either formed as an integral component of keyboard 28 or mounted thereon as an accessory peripheral. Optical cursor control device 110 is preferably positioned in such manner that keyboard keys 30 are below the sensor field of view. In a notebook or laptop configured computer 10, optically tracking cursor control device 110 is optionally located on the display panel portion, preferably below the edge of screen 22 adjacent to keyboard 28.

Figure 4:
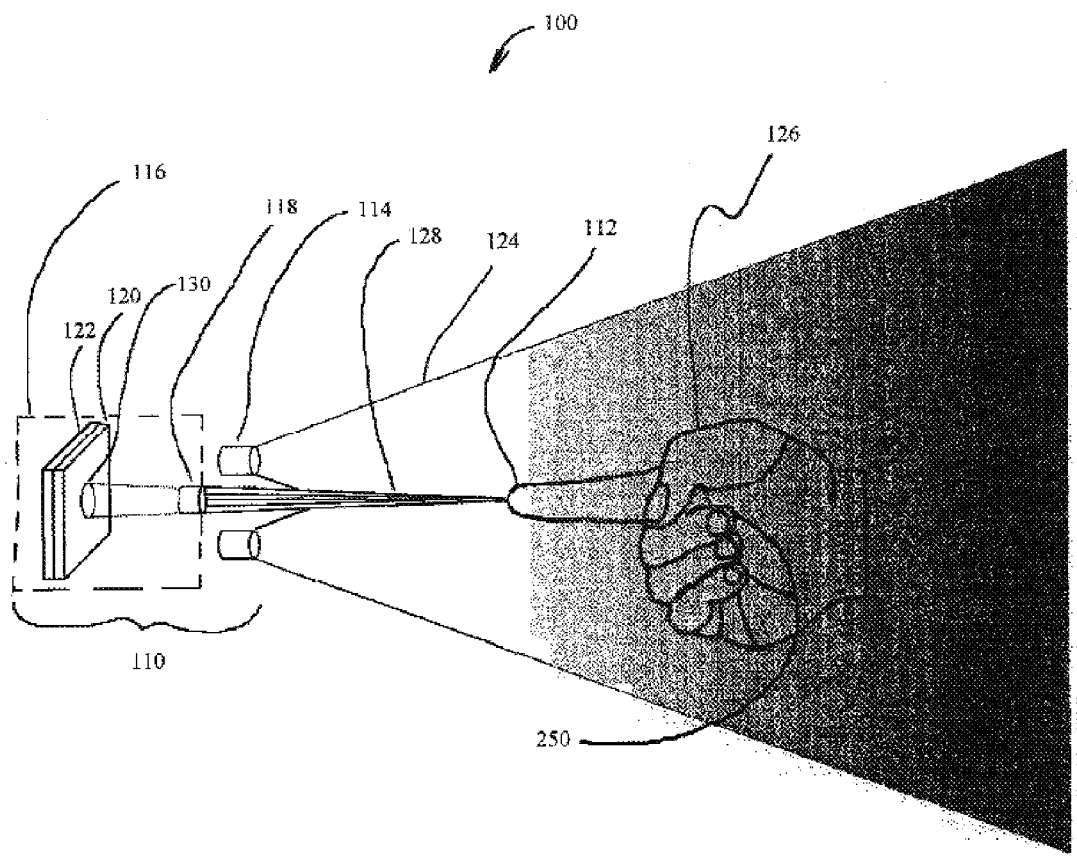
FIG. 4 is a schematic block diagram of the optical components of optical tracking system of the present invention, including the optical tracking cursor control device, a passive reflecting object, and the interaction thereof.

FIG. 4 is a schematic block diagram of the optical components of optical tracking system 100, showing optical tracking cursor control device 110, a passive reflecting object 112, and the interaction thereof Optical cursor control device 110 includes an illumination source 114 and a camera 116, which includes an imaging lens 118 focused on an optical sensor 120. An electronics circuit 122, coupled to optical sensor 120, is preferably a commercially available integrated circuit. Electronics circuit 122 is preferably implemented in an integrated circuit and discrete support components, and is optionally implemented in conjunction with optical sensor 120.

Illumination source 114 is preferably a non-visible form of electromagnetic radiation, such as an infrared light source, to reduce the distraction to a human user. Such light sources include one or more commercially available infrared Light Emitting Diodes or LEDs, also referred to as IREDs or IRLEDs for Infrared Light Emitting Diodes. Additionally, LED or IRED sources emit nearly monochromatic light, i.e. emissions in a relatively narrow band of wavelengths. The monochromatic emissions make filtering of ambient relatively wide band light simple and inexpensive. Exposed and developed color camera film attenuates wide band ambient illumination while passing IRED illumination. Furthermore, infrared illumination is particularly useful when optical sensor is implemented as a two-dimensional silicon image sensor because such emissions are known to be well matched to the spectral sensitivity characteristics of silicon image sensors such as a charge-coupled-device (CCD). Alternatively, illumination source 114 is implemented as a source, such as a LED or another device, emitting either visible light or another form of non-visible form of electromagnetic radiation.

Illumination source 114 is preferably mounted in cursor control device 110 and essentially collocated with imaging lens 118 of camera 116. Preferably, emits an essentially solid angle of light 124 that is directed toward the user's hand 126 when positioned in a proper typing position relative to keyboard 28. Illumination 124 is preferably primarily directed toward one or both of user's index fingers when positioned over the "F" and "J" keys of a conventional QWERTY keyboard 28. The angle of light beam 124 is preferably such that it is centered on the position normally occupied by the chest area of a user in a normal position to engage keyboard 28. Thus, light beam 124 is aimed slightly above the level of keys 30 on keyboard 28 such that, when reflecting object 112 is implemented as digit 112 of hand 126, digit 112 is disengaged from key 30 and raised slightly from a typing position to intercept the beam. The intensity gradient of illumination 124 inherently decreases along the axis of the light beam travel as it is projected away from source 114 as a function of the square of the distance from the source. According to a preferred embodiment, the Light Emitting Diodes forming illumination source 114 inherently form a two-dimensional light pattern. The LED's inherent light pattern is considered in their placement and orientation to provide the most effective illumination patterns. Furthermore, LED light sources 114 are positioned in close proximity to imaging lens 118 of camera 116 so that reflection from reflecting object 112 toward imaging lens 118 is maximized. Accordingly, a portion of illumination 124 strikes reflecting object 112, which reflects either visible or non-visible forms of electromagnetic radiation, i.e. light. According to a preferred embodiment, reflecting object 112 is the bare tip of one digit of the user's hand, i.e. the user's fingertip. This bare fingertip embodiment is referred to hereinafter as the Bare Finger Pointing, or BFP, mode.

An object beam 128 formed of a portion of light reflected from reflecting object 112 enters lens 118 and is focused thereby to form an image 130 on sensor 120. Portions of illumination light 124 not reflected by reflecting object 112 strike other parts of user's hand 126. The illuminated portions of hand 126 reflect some of light 124. These additionally illuminated portions of hand 126 are positioned farther away from cursor control device 110, i.e. from illumination source 114 and camera 116. Therefore, the decreasing gradient of illumination light source 114 causes less light to impinge upon these more distant portions of hand 126, which in turn causes less light to reflect into the lens 118 relative to the amount of light reflected from reflecting object 112, i.e. user's finger tip.

In a preferred embodiment, optical imaging lens 118 is single element aspheric (plastic) camera lens for imaging reflected light 128 onto image sensor 120. Preferably, aspheric camera lens that includes a pin hole aperture in close proximity, either before or after the lens, for stopping down the "f" number. The inclusion of a pin hole aperture is generally well known to those of ordinary skill in the art as a technique for limiting the amount of light entering the lens, which results in less aberrations and a longer depth of field. Alternatively, optical imaging lens 118 is a conventional optical camera lens for imaging reflected light 128 onto image sensor 120.

Image sensor 120 is preferably a commercially available two-dimensional CMOS (complementary metal-oxide semiconductor) active pixel sensor such as is well-known in the art. Alternatively, image sensor 120 is a CCD (charge-coupled-device) array of pixels such as is also well-known in the art. Electronics circuit 122 is coupled to convert the image incident on image sensor 120 to an electrical video signal. Image sensor 120 transmits electronic signals to associated electronics circuit 122, in which are set signal thresholds to detect the brightest objects imaged of the illuminated objects. The signal thresholds are defined by, for example, novel algorithms disclosed in Provisional Patent Application No. 60/202,512, entitled A FAST ALGORITHM FOR TRACKING OBJECTS IN AN IMAGE, filed in the name of Richard S. Johnston on May 5, 2000, the complete disclosure of which is incorporated herein by reference. In other words, electronics circuit 122 thresholds image 130 to determine the address of all pixels of image sensor 120 having a brightness level above a predetermined threshold. Electronics circuit 122 further determines the connectivity of all the pixels having an above-threshold brightness level, and determines which pixels are connected to form an object. All pixels in the object are averaged to determine the centroid of the object, shown in FIG. 8. Electronics circuit 122 generates an output as a function of the position of the centroid relative to image sensor 120, and which is suitable for interfacing image sensor 120 to a processor 12 (shown in FIG. 1) via a standard port, such as a Universal Serial Bus (USB), mouse port, serial interface or another suitable port. Motion of reflecting object 112, i.e. user's finger tip, within the field of view of camera 116 is translated into movement of the computer's on-screen cursor by any of several conventional and commonly known techniques, typically implemented on a computer in a software program. Various known methods exist for extracting the position of reflecting object 112 from image 130 formed on image sensor 120. For example, the image is passed to processor 12 via video cable, where image digitization and other functions are performed by known software algorithms. According to another known method for extracting position information from image 130, electronics circuit 122 contains a frame buffer and microprocessor to perform image digitization and other functions within camera 116. According to yet another embodiment, the image extraction algorithm is split between dedicated electronics circuit 122 and a computer, as disclosed by Friedman et al in U.S. Pat. No. 4,891,630. Thus, dedicated electronics circuit 122 thresholds the image as it is read out of imaging sensor 120, creating a binary image made up of ones and zeros. Counters keep track of the address, i.e., the pixel location within the image, of the pixel being read from imaging sensor 120. Changes, either from one to zero or from zero to one, in the binary image indicate that an object boundary has been crossed (ignoring effects at the edge of the image). The pixel address and change direction of these object boundaries are determined and sent to processor 12, which uses conventional algorithms to assemble line segments and calculate centroids. Each of these alternative methods is similarly contemplated by the present invention.

Figure 5:
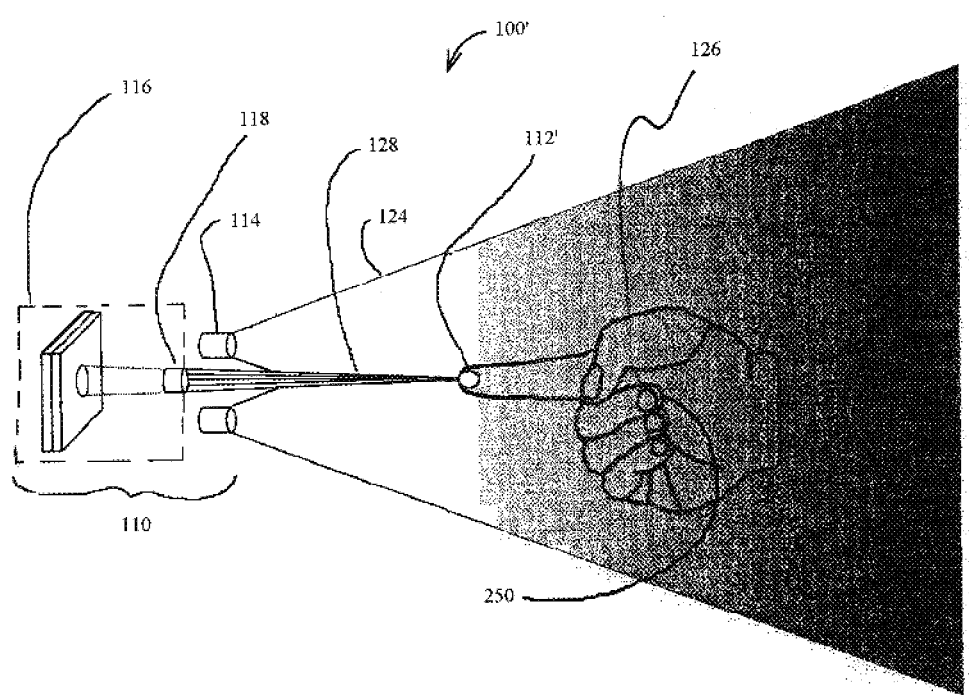
FIG. 5 is a schematic block diagram of an alternative optical tracking system of the present invention.

FIG. 5 is a schematic block diagram of an alternative optical tracking system 100' that is essentially the same as optical tracking system 100 shown in FIG. 4. The difference between optical tracking systems 100 and 100' is that the user's fingertip reflector 112 is augmented with a highly reflective device 112' relative to the user's finger tip, whereby optical tracking system 100' operates according to an alternative Augmented Finger Pointing, or AFP, mode. Preferably, reflective device 112' is a highly reflective retroreflector appliance, such as a retroreflective self-adhesive material that adheres directly to the skin of the user's finger. Retroreflective material inherently reflects light from a source back in the direction of the source. Thus, light 124 from source 114 is reflected as object beam 128 back towards source 114, and thus toward essentially collocated camera lens 118. Retroreflective device 112' provides a signal-to-noise ratio advantage over natural skin reflector 112 by reflecting significantly more light toward cameral lens 118. This increased signal ratio between the target retroreflector 112' and the other illuminated parts of user's hand 126 allows for increased distance of operation between the user and cursor control device 110. Retroreflective device 112' is optionally attached to the user's face or head, thereby forming a "head tracker" device. For example, retroreflective device 112' is a small dot of retroreflective material attached to the user's forehead, to an earpiece, or to the frame of a user's eye glasses.

Figure 6:
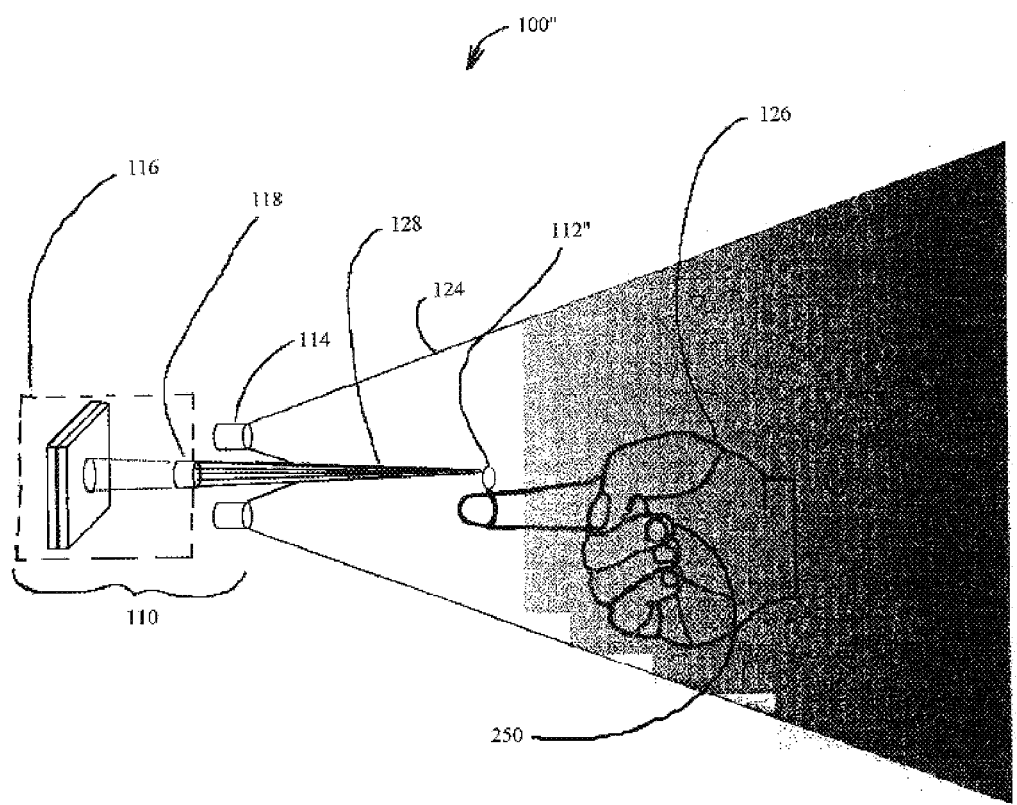
FIG. 6 is a schematic block diagram of another alternative optical tracking system of the present invention.

FIG. 6 is a schematic block diagram of another alternative optical tracking system 100" that operates in the AFP mode. Alternative optical tracking system 100" is essentially the same as optical tracking system 100' shown in FIG. 4. The difference between optical tracking systems 100" and 100' is that, rather than adhering directly to the user's fingertip, reflector device 112" is worn on the user's finger, for example, the index finger or either hand. A reflective portion of augmentation reflector device 112" is preferably formed of a retroreflector material, so that a maximum signal ratio is achieved between reflector 112" and user's hand 126.

According to the embodiment of the invention illustrated in FIG. 6, reflective appliance 112" is slipped onto the user's finger. Placement of reflective appliance 112" on the finger is optional among any number of locations. Useful locations include finger tip, finger nail, or any other location along the user's finger or digit. Thus, reflective appliance 112" is optionally placed in a location of maximum efficiency and/or maximum comfort relative to illumination source 114 and lens 118. Ring-type reflector 112" is also easy to don and to remove by just slipping it on and off the finger. Preferably, on a reflective portion of reflecting object 112" is formed of retroreflective material; the remainder is a non-reflective connector adapted to attach the reflecting portion to the user's finger. For example, the connector portion of reflecting object 112" is a ring configured of a comfortable elastic band that adjusts to the user's finger size.

Operation of optical tracking system 100 in each of the above described horizontal Finger Pointing, or FP, modes (BFP, AFP modes) entails merely lifting one digit, for example, an index finger, and pointing the digit towards photosensor lens 118. The user moves the digit about, either up and down, side to side, or a combination of both, to move the cursor. The user's finger motion is translated into cursor motion by execution of one of several alternative software programs, which is preferably resident on computer 10. One such software program is described in detail below.

"Clicking," i.e. on-screen selection, is preferably accomplished by a digit of either hand striking an appropriate key of keyboard 28 having a designated function, for example, one of clicker keys 102, 104, and 106 (shown in FIG. 3). Optionally, striking is accomplished using the thumb of either or both user's hands.

Figure 7:
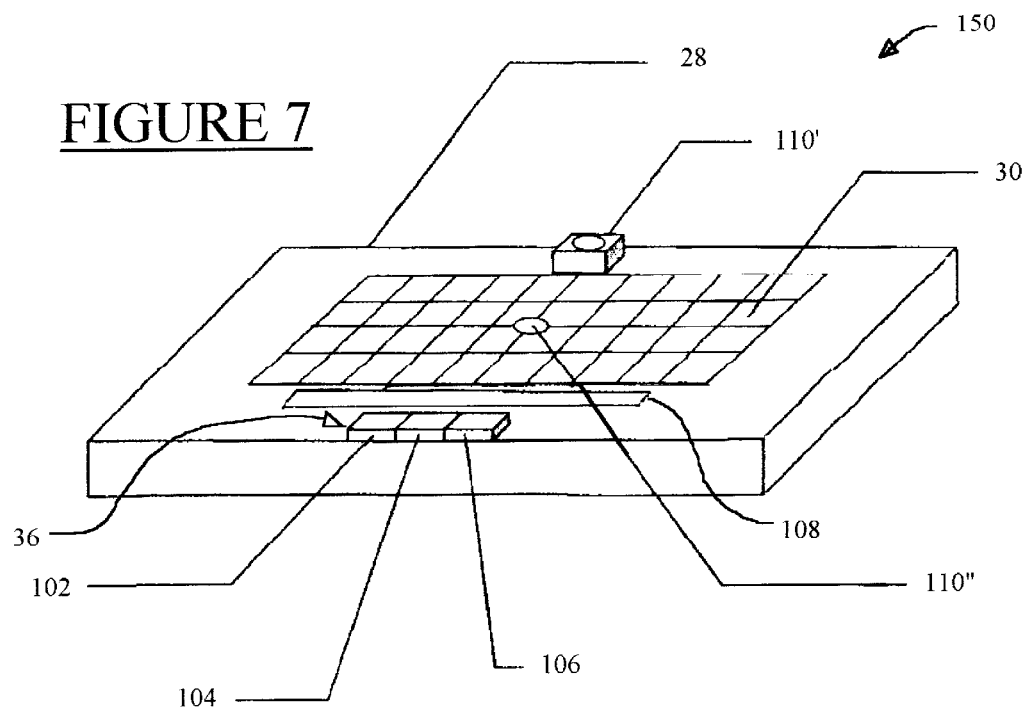
FIG. 7 illustrates two alternative vertical optical tracking systems of the present invention.

FIG. 7, in contrast to the above described horizontal Finger Pointing modes of optical tracking system 100, shows two alternative vertical FP mode embodiments 150. Vertical cursor control devices 110' and 110" of alternative vertical FP mode embodiments 150 also include one or more light sources 114 essentially collocated with lens 118 of camera 116. Vertical cursor control device 110' is a free-standing embodiment of the invention having camera 116 and light sources 114 embodied in a accessory peripheral suitable for mounting on keyboard 28 in any suitable location. For example, in FIG. 7, vertical cursor control device 110' is mounted above keys 30. According to one alternative embodiment (not shown), vertical cursor control device 110' is mounted below keys 30, for example, in the position held by touchpad 32, as shown in FIG. 1. According to other alternative embodiments, (not shown), vertical cursor control device 110' is mounted on one side of keyboard 28, off the top key surface and accessible, for example, by a pinky or little finger of either of the user's hands without completely disengaging the hand from keyboard 28. In another alternative embodiment (not shown), vertical cursor control device 110' is located remotely from keyboard 28, for example, in a position on the work space adjacent keyboard 28, as exemplified by remote mouse 26 (shown in FIG. 1).

Vertical cursor control device 110" is formed as an integral component of keyboard 28, having integral camera 116 and one or more integral light sources 114 essentially collocated with imaging lens 118. According to one alternative embodiment, camera component electronics circuit 122 of integral vertical cursor control device 110" is located remotely from and electrically coupled to optical sensor 120, while optical sensor 120 and imaging lens 118 are positioned on keyboard 28, approximately as shown. According to yet another alternative embodiment, both of optical sensor 120 and imaging lens 118 are located remotely from the key surface of keyboard 28. According to still another alternative embodiment, one or more light sources 114 are located remotely from the key surface of keyboard 28, and one or more optical fibers are positioned on the key surface of keyboard 28, as shown, and transmit illumination light 124 (shown in FIG. 4) from light sources 114 to the key surface of keyboard 28 and direct an essentially solid angle of light 124 that is directed toward the user's hand 126 when positioned in a proper typing position relative to keyboard 28. Such remote positioning of either or both of any components of camera 116 and light sources 114 reduce the complexity of incorporation of the invention in various different designs of keyboard 28. Light beam 124 (shown in FIGS. 4, 5, 6) from light sources 114 illuminate a passive reflecting object 112 (shown in FIGS. 4, 5, 6). Reflected light 128 from passive reflecting object 112 is directed to imaging lens 118 of camera 116, as described in detail above.

Figure 8:
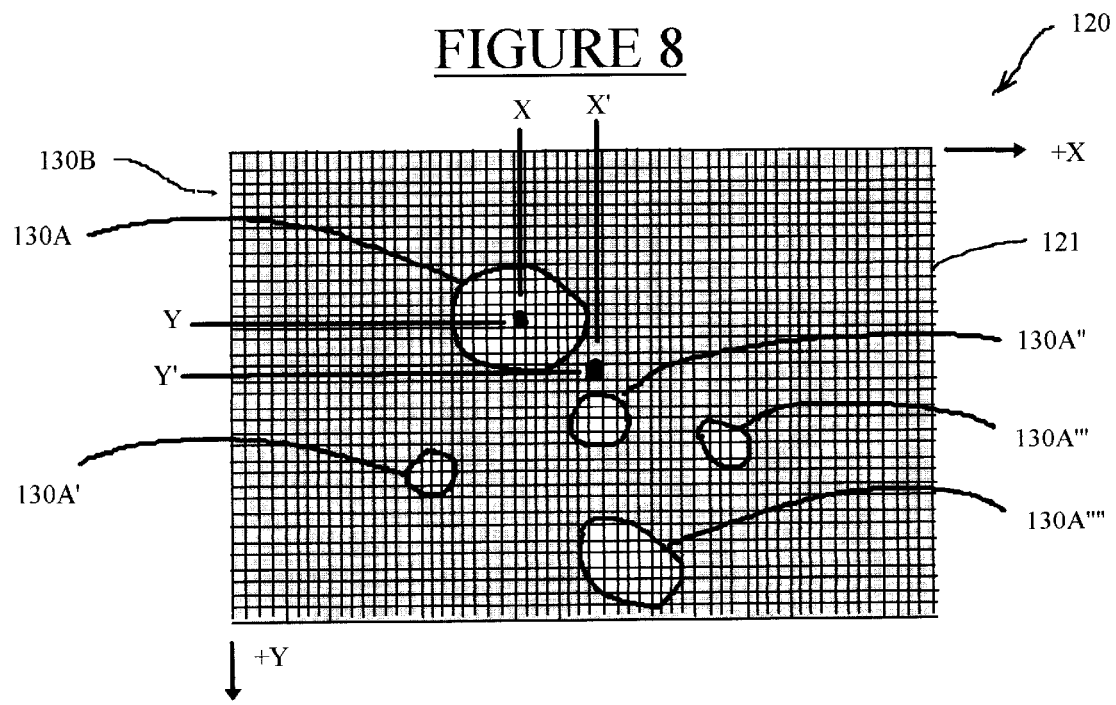
FIG. 8 is a simplified illustration of the image of a passive reflecting object of the present invention on an optical sensor of the present invention.

FIG. 8 is a simplified illustration of image 130 of passive reflecting object 112 on optical sensor 120. As shown, image 130 is formed of one or more brighter portions 130A through 130A$^N$ each caused by reflected light from reflections appearing within the field of view of camera 116 in a plane essentially parallel to the key surface of keyboard 28. Brighter portions 130A through 130A$^N$ include a reflection of reflecting object 112 (represented as bright portion 130A) and reflections of other parts of user's hand 126 (represented as bright portions 130A' through 130A$^4$) lying within the view of camera 116. Such extraneous object images occur as noise in image 130. The remainder of image 130 is formed of relatively darker portion 130B caused by ambient light and reflections from less reflective and/or more distant bodies. Each image portion 130A through 130A$^N$ and 130B include a number of pixels 121 of optical sensor 120. The brightness of image 130A of passive reflecting object 112 and images 130A' through 130A$^4$ of reflective portions hand 126 are above the threshold brightness value mentioned above, while relatively dimmer image 130B is below the threshold. Therefore, images 130A through 130A$^4$ are detected as objects. By definition, dark portions 130B of image 130 contain no object images.

Alternatively, the invention is practiced using a negative or dark image of reflecting object 112. According to this embodiment, reflecting object 112 does not require any reflective characteristic. Rather, reflecting object 112 is an object, such as a digit 112 of user's hand 126 (shown in FIG. 4) having a low coefficient of reflectivity relative to, for example, a mirrored surface or a retroreflective surface. According to this dark image embodiment, either of vertical cursor control device 110' or 110" is formed having integral camera 116, but does not include light sources 114. Rather, ambient light from the vicinity of computer keyboard 28 impinges on imaging lens 118 and forms a light image on photosensor 120. Low reflectivity object 112 positioned within the field of view of camera 116 casts a shadow or dark image on photosensor 120.

Motion Detection

Figure 9:
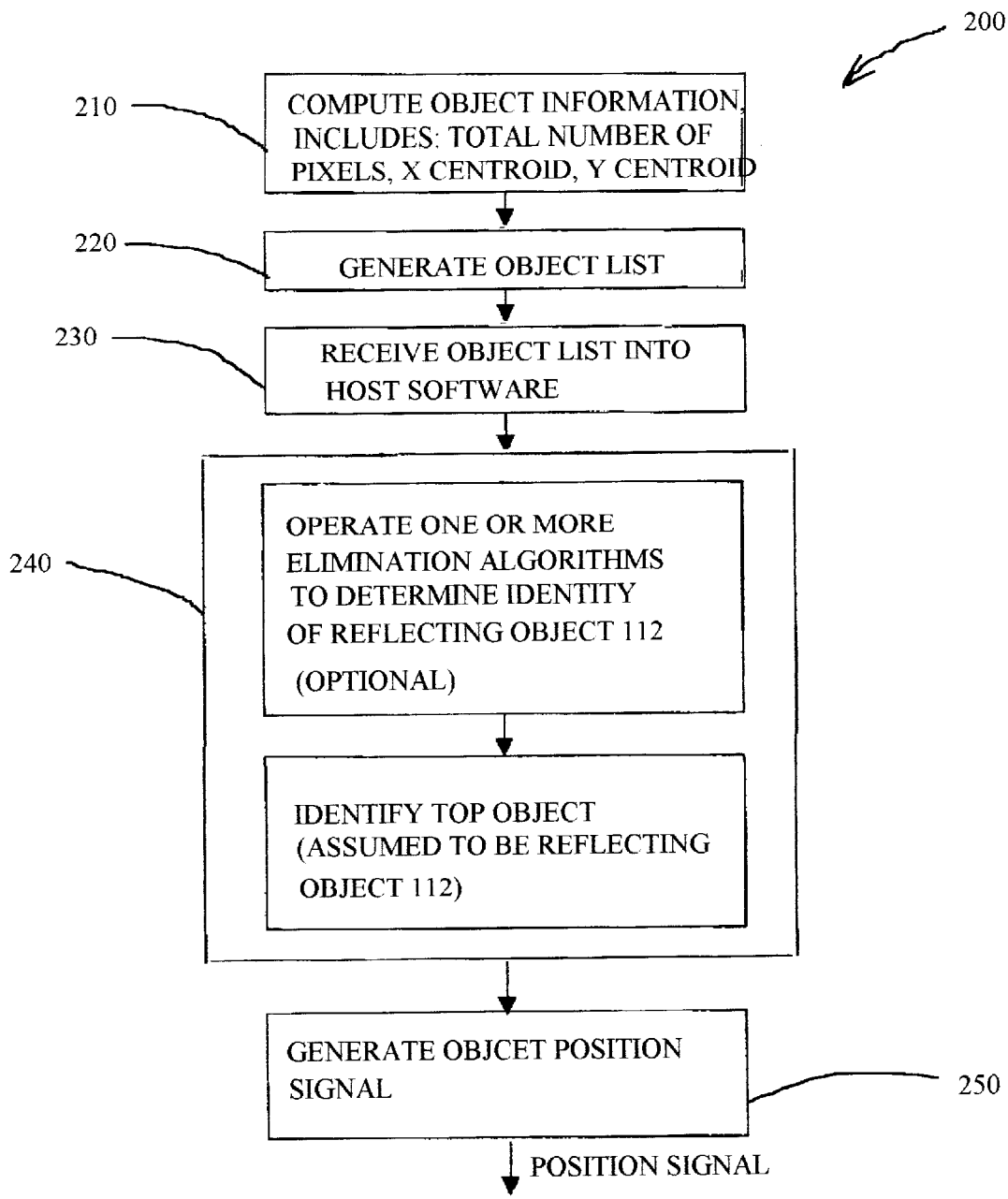
FIG. 9 illustrates a flow chart describing one exemplary embodiment of a signal processing operation of the present invention that determines the end or tip of an illuminated pointing digit of the present invention appearing in the image of a passive reflecting object, without responding to other illuminated portions of a pointer.

FIG. 9 illustrates the flow chart 200 describing one exemplary embodiment of a signal processing operation that determines the end or tip of pointing digit 112, without responding to other illuminated portions of hand 126. Determination of the tip of pointing digit 112 is a function of the physical arrangement relationship between camera 116 and digit 112. Camera 116 and digit 112 are arranged such that image 130 of digit 112 on photosensor 120 of camera 116 is always the object closest to the top edge of detected image 130 in relation to other objects imaged.

As illustrated in FIG. 9, in operation, signal processing operation 200 of the invention in Block 210 computes information about each reflective object in image 130, including: total number of pixels, x centroid (labeled X in FIG. 8), and y centroid (labeled Y in FIG. 8). A list of the objects, including the computed information, is generated In Block 220. In Block 230, the object list is presented to host software resident on processor 12 of computer 10. For example, reflecting object 112 and various reflective hand 126 objects detected in the illustration shown in FIG. 8. The object list contains all of the above object information about each reflective object in image 130.

As shown in FIG. 8, pixels 121 of image sensor 120 are assigned arbitrary x and y values, for example, with x values increasing towards the right and y values increasing downwardly. In Block 240, signal processing operation 200 always chooses as the object to use for pointing the top object, i.e. the object having the minimum y value centroid. In Block 240, signal processing operation 200 optionally utilizes the object size, object motion, and object clustering information as inputs to elimination algorithms to eliminate unwanted objects before determining the identity of the top object. For example, one elimination algorithm uses clustering techniques to eliminate an object that is not part of a predetermined arrangement of objects. Another method uses a motion-based elimination algorithm whereby only objects that move according to a predetermined pattern are within the set objects of interest. Still another method eliminated unwanted objects as a function of size. In other words, only objects that measure within a predetermined range of sizes are passed. The top object remaining after such elimination techniques is assumed to be the pointing object. Reflecting object 112, i.e. one of digit 112 and reflective material objects 112' and 112", is thereby isolated from noise and other reflecting objects imaged by camera 116. However, implementation of the invention using a retroreflective reflecting object 112' or 112" allows elimination of all reflecting objects that are not the pointing object. The only object remaining after thresholding techniques are applied is assumed to be the pointing object.

The resulting object is output for use as the pointer location to control the motion of cursor 24 (shown in FIG. 1). In Block 250, a position signal representative of the position of pointing object 112 relative to image sensor 120 is generated and output to control an instantaneous position of cursor 24 relative to screen 22, thereby controlling cursor motion. The position signal is, for example, the instantaneous x centroid and y centroid of image 130A.

The above described Finger Pointing (FP) modes optionally include various software features that enhance their usefulness. The gain of each is optionally selectable and/or adjustable to vary the amount of motion of reflecting object 112, i.e. user finger movement, for moving cursor 24 about the extents of display screen 22 (shown in FIG. 1). System filtering is optionally variable, whereby small twitches and jitters of reflecting object 112 are removed to improve fine positioning of cursor 24.

Selection

As noted above, "clicking," or on-screen selection, is optionally accomplished by striking an appropriate key on keyboard 28, using a digit of either hand. However, another useful optional feature of the various Finger Pointing (FP) modes is referred to herein as "Finger Bobbing" (FB). Finger bobbing is a way "clicking" on a selection or inputting a command to the computer. Finger Bobbing according to the present invention is accomplished by moving reflecting object 112 within the field of view of camera 116 to place an image onto photosensor 120, whereby cursor 24 is positioned over the object on screen 22 that the user desires to select or "click." Next, the user quickly moves reflecting object 112 to move cursor 24 away from the on-screen object, and then quickly moves reflecting object 112 to move cursor 24 back to approximately the original position over the on-screen object. Thus, the user "bobs" the cursor away from and back to the on-screen object that the user desires to select or "click." Software resident on computer 10 interprets this "bobbing" as an on-screen selection or "click.".

The present invention also provides a remote selection control that includes one or more targets sensed by a suitable pixilated photosensor, such as CMOS image sensor 120 or another suitable photosensor, interfaced to computer 10 via a standard port, such as a Universal Serial Bus (USB), mouse port, serial interface or another suitable port. However, references to camera 116, components of camera 116, and light sources 114 are merely exemplary; the present remote selection control invention may be practiced in combination with other camera systems and the invention is not intended to be limited in any way by reference to finger-pointing cursor control system 100 described herein. The targets are, alternatively, either active light emissive sources or passive reflective targets capable of reflecting light from an illumination source toward the sensor. Preferably, passive reflective targets are formed of a retroreflective material. Passive retroreflective targets eliminate the need to provide a power source in the remote control device in order to optically communicate with the sensor. Light from either type of target enters an optic element, i.e. a lens such as imaging lens 118, and is imaged onto the pixilated sensor. An electrical circuit, such as electrical circuit 122 described herein, coupled to the sensor interprets the illuminated pixels and transmits this information as a selection or "click" to host computer 10 for use by a software application.

The remote selection control device of the present invention varies the image transmitted to the photosensor. Changes in the image provide information which is subsequently coded and transmitted to host computer 10. The image is varied, for example, by varying the number of targets whereby the number of images transmitted to the photosensor changes. Alternatively, the image is varied by changing the shape of one or more of the targets, whereby the shape of one or more of the images transmitted to the photosensor changes. The varying number of targets is alternatively combined with a variable target shape, whereby the target variation results in a variation in the number and/or shape of the images transmitted to the photosensor. Those of skill in the art will recognize that any of the above changes in the received image provides information which, when subsequently coded and transmitted to the host computer 10, is optionally interpreted to indicate a selection or "click."

According to one embodiment of the invention, alternative variations in the transmitted image provide information which is subsequently coded and transmitted to the host computer 10 as a representation of a "double click."

In one preferred embodiment, one or more targets is attached to the user's head as a "head tracker" device and is used to remotely control cursor position. Alternatively, one or more targets are attached to or formed integrally with a hand held pointing device. When practiced in combination with one of the various finger-pointing cursor control systems 100 described herein, the reflective device is implemented as reflective object 112 (shown in FIGS. 4, 5, 6). In an active device, each target is light emissive while in a passive device, each target is either reflective or retroreflective. In the preferred passive retroreflective device, the changes in the received image that provide the selection information are either changes in the number or shape of the retroreflectors or, alternatively, a combination of changes in the number and/or shape of the retroreflectors.

Figure 10:
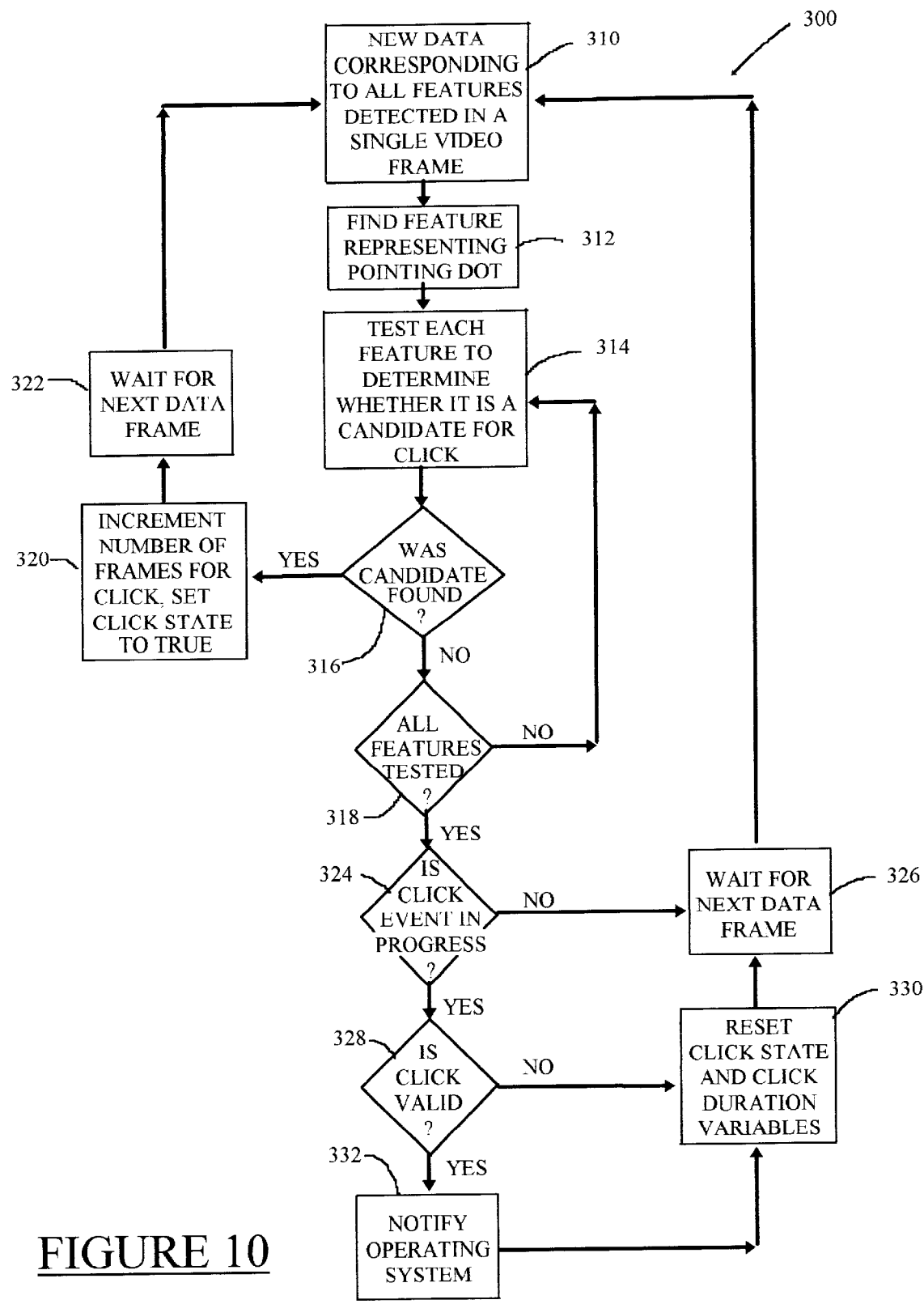
FIG. 10 is a flow chart describing one software implementation of one embodiment of the present invention for remotely controlling cursor motion, including making mouse-type screen selections.

FIG. 10 is a flow chart describing one software implementation of one embodiment of the present invention. Those of skill in the art will recognize that a software programmer of ordinary skill is capable of developing the source code to implement the method described in FIG. 10. According to the embodiment flow charted in FIG. 10, two targets, preferably retroreflectors, are present in the device. In a preferred embodiment, the remote selection control device of the present invention further controls the on-screen motion of cursor 24 (shown in FIG. 1), as described herein. Accordingly, during normal operation controlling the cursor, one of the targets is constant and unaltered while the second is deactivated. For example, when the target is a retroreflector, it is covered in normal cursor control operation. Alternatively, when the target is a light emissive source, it is not actively emitting light during normal cursor control operation. During selection, the second target is momentarily activated or "clicked." Those of ordinary skill in the art will recognize that the locations of all features appearing in each frame on display screen 22 of computer 10 are known based on the hardware implementation. The second or selection target preferably always appears as an image in a known location relative to the first cursor control target, and preferably as a separate image. The appearance of the second target in a known location relative to the first target allows a bounding box to be defined relative to the first target in which a "click" may be announced. Images appearing outside the bounded "clicking" box are disregarded.

The momentary "click" has a definable range of duration which may be expressed in time, but is preferably expressed in a quantity of frames, which is preferably a user defined minimum quantity or range. In a preferred embodiment, the appearance and subsequent disappearance after a predetermined finite number of consecutive frames of a second image in predetermined relationship to the first cursor control image indicates that a clicking event has occurred. After a clicking event has occurred, a message is transmitted informing the operating system of the clicking event. In a retroreflector embodiment, the retroreflector is momentarily exposed to a light source, such as light source. 114 (shown in FIGS. 4, 5, 6), within the field of view of the camera. The retroreflector remains exposed during the predetermined number of frames and is then quickly removed. For example, the second retroreflector is momentarily uncovered to make the selection and then covered again after the predetermined number of frames. Momentary exposure is accomplished, for example, similarly to the flashing of a signal light by momentarily opening and closing the mechanically rotatable slats of a louvered shutter. Those of skill in the art will recognize that a such momentary exposure of the retroreflector is easily implemented in a large variety of configurations. Other examples include dilating "camera" shutters, doors, retroreflector rotation, slides, electro-optical windows and other suitable occlusion devices. When implemented in combination with one of the various finger-pointing cursor control systems 100 described herein, the two targets are implemented as first and second reflective object 112 (shown in FIGS. 4, 5, 6). Accordingly, each reflective device is implemented in accordance with FIG. 4 as one of two preferably adjacent digits 112 and 250 of the user's hand 126. When practiced in combination with one of the various finger-pointing cursor control systems 100 shown in FIGS. 5 and 6, each reflective device is implemented as a reflective, preferably retroreflective, device installed on one of two preferably adjacent digits 112 and 250 of the user's hand 126. All of these various configurations are within the contemplation of the present invention.

In a light emissive embodiment, the second light source is momentarily activated to make the selection, for example, either by momentarily uncovering the light in similar manner to that described for momentarily exposing the second retroreflector or by making and breaking a momentary contact, such as is used in an ordinary flashlight. Thus, an emissive target, or light source, that is active or "on" substitutes for an uncovered retroreflective target while an emissive target, or light source, that is inactive or "off" substitutes for a covered retroreflective target. Again, those of skill in the art will recognize that a such momentary light emission is easily implemented in a large variety of configurations, including a mix of retroreflectors and light sources, all of which are within the contemplation of the present invention.

According to the flow chart 300 illustrated in FIG. 10, software resident on computer 10 responds in Block 310 to new data corresponding to essentially all features detected in a single video frame. In Block 312, the feature representing the first or cursor control target if found. In Block 314, each additional features that is not the cursor control target is tested to determine whether it is the second "clicking" target. Testing is accomplished by determining whether the features is located in a predetermined relationship to the first target, i.e. within the bounded "clicking" box. Features outside the bounded "clicking" box are disregarded. In Decision Block 316, if the tested feature does not have the requisite relationship to the first target, i.e. is not a candidate for click feature, another Decision Block 318 is entered, where upon the application determines whether all features detected in the current video frame have been tested. If untested features are found in Decision Block 318, the application is looped back to Block 314 and the next feature is tested until all features are tested or until a feature is determined to have the predetermined location relationship to the first target, signifying a "candidate" feature. Upon determination of a candidate feature in Decision Block 316, Block 320 is entered wherein the number of frames during which the candidate feature is present is incremented and a clicking state variable is set to indicate that a clicking event is in progress. For example, the value of the clicking state variable is set to TRUE. After incrementing the frame number and setting the clicking state variable, the application waits for the next video data frame, as indicated by Block 322. Data from each successive video frame is also tested for a feature indicating that a clicking event is in progress.

When a video frame is inspected and found to have no click candidate, Decision Block 318 is again entered and the application is looped back to Block 314. Next features are tested until all features are tested. Upon determination that no untested features remain and that no click candidates are found in the current video frame data, Decision Block 324 is entered to determine whether a clicking event is currently in progress. The determination of whether a clicking event is in progress is a function of the current value of the clicking state variable. For example, if the current value of the clicking state variable is TRUE, a clicking event is in progress. If the current value is FALSE, no clicking event is in progress. The inverse values may also be used. If an in-progress clicking event is not found in Decision Block 324, i.e. the clicking state value is FALSE, and as indicated in Block 326, the application waits for the next video data frame, without resetting the clicking state variable.

However, if a clicking event is in progress as defined by the current value of a clicking state variable, i.e. TRUE, the click is complete. This is known because the clicking state variable at this point in the program flow indicates that a click was in progress and no click candidate was found in the current frame. The application next determines whether the click was valid. As described above, a click is valid when the candidate feature is present in the proper relationship to the cursor control target during the predetermined range quantity of consecutive video frames.

In Decision Block 328, the clicking duration variable, i.e. the number of consecutive video frames in which a click candidate was found, is tested to determine whether the candidate feature was present for a number of video frames within the predetermined range quantity. If this duration test fails, in Block 330, the application resets the clicking state variable to its inactive state, i.e. FALSE, and resets the click duration variable in preparation for the next click candidate. Then as indicated in Block 326, the application waits for the next video data frame. However, if the duration test passes, the click is valid. The application in Block 332 generates a signal to inform the operating system of computer 10 to simulate a mouse click. The application also resets the clicking state variable to FALSE, resets the click duration variable for the next click candidate, and waits for the next video data frame.

The commonly termed "click and drag" function of the mouse requires the constant depression of the standard "mouse button." The "click and drag" function is accomplished remotely by the present invention using one of the well-known conventional "click and drag" function of the prior art.

One alternative embodiment is a variation of the above two-target system in which the second target is normally active. The second target is momentarily deactivated and quickly reactivated to indicate a selection or "click." The "dragging" function is accomplished by the first target during an extended period of deactivation of the second target.

Additional Alternative Embodiments

According to another alternative embodiment, a single target is used to perform the mouse functions, including at least the cursor positioning function, the selection or "clicking" function, the "click and drag" function, and the "double clicking" function. The invention is configured using either a retroreflector or a light emitter as the single target. The single retroreflector is covered, i.e. removed from the line of site of the illumination source or physically occluded, and then uncovered to reflect to indicate a selection or "click." Preferably, the period during which the single retroreflector is covered is momentary, i.e. a predetermined quantity or quantity range of frames. Alternatively, the target is an active or emitting light source which is momentarily deactivated or occluded to indicate a selection or "click."

According to yet another embodiment of the single target system, the sensor is responsive to variations in the intensity of the remote signal which are less than the extremes of "on" and "off." Accordingly, the target is momentarily modified to either increase or decrease the intensity of the signal conveyed to the photosensor. For example, in a retroreflective target system, a portion of the retroreflector is momentarily occluded using, for example, a partially closing dilating shutter. Alternatively, the dilating shutter is normally partially open such that the retroreflector is normally partially occluded. The shutter is fully opened momentarily such that a larger area of the retroreflector is illuminated and the remote signal is proportionally intensified above a normal operating threshold. The variable intensity single target embodiment is similarly implemented in a system using a remote emission source by momentarily changing the illumination drive signal in a system analogous to flashing the bright headlights on an automobile to increase the light intensity above the threshold of the normal headlight operation. In each of the retroreflective and remote emission embodiments, an additional level of signal intensity is interpreted as the "double click" described above.

Figure 11A:
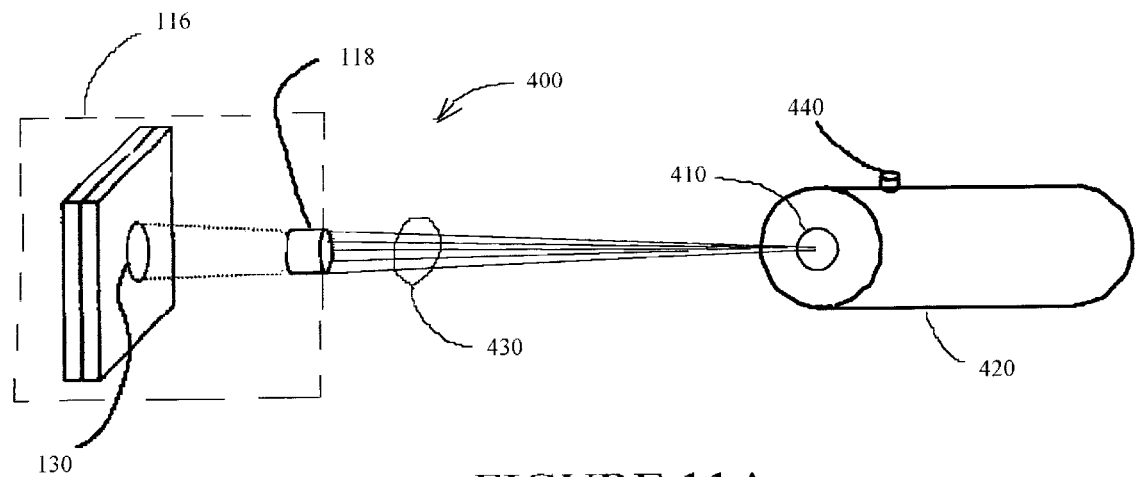
FIG. 11A illustrates an active remote "wand" cursor control and selection system of the present invention that conveys cursor directional motion commands by forming object images on the pixels of a photosensor array.

FIG. 11A illustrates a remote cursor control and selection system 400 that conveys cursor directional motion commands by forming object images on the pixels of a photosensor array, such as optical sensor 120, disclosed herein. In a preferred embodiment, a control object 410 formed of a light source mounted in a housing 420 configured as a slender, hand-held rod or "wand." Control object 410 is formed of any source for generating and emitting a beam 430 of electromagnetic radiation, which is either visible or non-visible. For example, non-visible infrared emitting sources, such as commercially available Infrared Light Emitting Diodes, or IRLEDs, mentioned above. A suitable power supply for energizing the radiation source is coupled to control object 410. For example, one or more batteries is provided within housing 420 and electrically coupled to energize control object 410 through a user controlled switch 440. Control object 410 is positioned in the field of view of the camera, for example, camera 116 disclosed herein. Preferably, camera 116 is formed of optical imaging lens 118 that images projected light beam 430 generated by control object 410 onto image sensor 120. The pin hole aperture in close proximity to the aspheric camera lens in optical imaging lens 118 increases the camera's ability to image distant objects by increasing the depth of field. Image sensor 120 is preferably one of a commercially available two-dimensional CMOS active pixel sensor and a CCD array. Image sensor 120 transmits electronic signals to associated electronics circuit 122, in which are set signal thresholds to detect the image of control object 410. Control object 410 is energized within the field of view of camera 116. As noted above, the preferred infrared emitting sources forming control object 410 emit radiation confined within a relatively narrow band of wavelengths. Therefore, wide band ambient light is preferably attenuated by filters, while illumination light from the target object is passed. Image sensor 120 transmits electronic signals to associated electronics circuit 122, in which are set signal thresholds to detect the image of relatively bright control object 410 on sensor 120. Electronics circuit 122 thresholds image 130; determines the connectivity of all the pixels having brightness level above the threshold value; determines which pixels form an object; and determines the centroid X, Y of the object, shown in FIG. 8. Electronics circuit 122 generates an output signal as a function of the position of the object centroid relative to image sensor 120, and which is suitable for interfacing image sensor 120 to a processor 12 (shown in FIG. 1) via a standard input port.

In operation, control object 410 is normally "off" or inactive. The physical position of control object 410 that is desired as the screen center is selected by the user. The user determines the physical position that is mapped to the center of the display screen by activating control object 410 within the field of view of camera 116. In a preferred embodiment, wand 420 includes a control key 440 for activating control object 410. The physical position occupied by control object 410 when activated is imaged onto sensor 120 at a position, for example spot 130A in FIG. 8, determined by the position of control object 410 relative to sensor 120. The centroid of the image 130 of the control object 410, for example, pixel X, Y of image spot 130A, is determined by electronic circuit 122. Pixel X, Y is the originally activated pixel. Electronic circuit 122 generates an output signal identifying the position of the centroid relative to image sensor 120. The appearance of the image of control object 410 on sensor 120 automatically maps the pixel of imaging sensor 120 containing the centroid of image 130 of control object 410 to a predetermined pixel of the display screen, preferably a pixel positioned essentially at the center of the display screen. Thus, if control object 410 is positioned relative to the field of view of camera 116 such that it is imaged onto the center pixel of imaging sensor 120 (labeled X', Y' in FIG. 8), that center pixel of imaging sensor 120 is mapped to the center pixel of the display screen. Alternatively, if as shown in FIG. 8, the centroid of the target object is positioned off the central axis of the field of view of camera 116 and is imaged onto another pixel (labeled X, Y in FIG. 8), that off-center pixel of imaging sensor 120 is mapped to the center pixel of the screen. Alternatively, the centroid of image 130 is mapped to another screen pixel, such as an upper or lower corner of the display screen, or another suitable screen pixel.

While control object 410 remains active, the position of its image on sensor 120 determines its position relative to the display screen. In other words, as long as control object 410 continues to emit radiation within the field of view of camera 116, it is imaged onto one or more pixels of sensor 120. As the position of control object 410 changes relative to camera 116, the pixel of sensor 120 onto which its centroid is imaged also changes. The instantaneous position of the image of control object 410 relative to sensor 120 thus determines the instantaneous position of the cursor relative to the display screen. Thus, motion of control object 410 translates to motion of the cursor on the display screen. In practice, motion of control object 410 within the field of view of camera 116 is translated into on-screen cursor movement by any of several conventional and commonly known techniques mentioned above and typically implemented on a computer in a software program.

The invention enlists a default gain setting that automatically defines the relationship between the amount of spatial movement of control object 410 relative to sensor 120 and the cursor movement on the screen. The gain is a multiplication factor which determines how many screen pixels are traversed by the cursor for each image sensor pixel traversed by the target object. The number of cursor pixels traversed relative to the number of sensor pixels is a function of the angular motion of the target object relative to the sensor. Wand 420 containing control object 410 is intended for use at a distance from the sensor, and therefore, a relatively expansive physical motion of wand 420 is a much lesser angular motion. Remote wand controller 400 thus requires a high gain to control the screen cursor. The gain is optionally user selectable, whereby the user selects a different ratio of spatial movement to cursor movement. In other words, in a preferred embodiment, the user is able to limit the amount of target movement needed to move the cursor across the screen or expand the cursor's response to small target movements. A high ratio of target motion to cursor motion allows for very smooth cursor motion and accurate cursor positioning. A low ratio of target motion to cursor motion allows for rapid cursor repositioning. The ratio of target movement to cursor movement is preferably defined for a continuum between the two described extremes. The ratio is preferably either infinitely adjustable along a continuum between these extremes or adjustable in predetermined steps.

According to one embodiment, the invention optionally determines the number of imaging sensor pixels between the originally activated pixel and the center pixel of the screen. The invention applies the current gain setting and computes the difference in pixels between the distance to the edge of the imaging sensor and the distance to the edge of the screen. If motion of control object 410 to an edge of imaging sensor 120 will not drive the cursor to the corresponding edge of the screen, an audio or textual message is generated and respectively annunciated on system speaker (not shown) or displayed on the system display screen, warning the user of the condition. However, the user need only deactivate control object 410 and subsequently re-activate it to establish a new originally activated pixel and thereby redefine the physical position of control object 410 relative to the center of the screen. Thus, the pixel count limitation is redefined and/or eliminated.

Furthermore, optional system filtering is added to smooth the motion of control object 410 as it is translated into motion of the cursor on the screen. According to one embodiment of the invention, the motion of control object 410 is averaged over predetermined time periods to smooth the cursor's on-screen motion.

As described above, motion of the cursor on the display screen is accomplished by motion of control object 410 in an activated state. Cursor motion tracks the motion of control object 410 by continuously updating the instantaneous pixel location of the centroid of the image of control object 410 and translating the centroid location to a corresponding screen pixel. Thus, the user moves the cursor to on-screen locations associated with user applications and commands. In a preferred embodiment, the user inputs object selections and computer commands by deactivating control object 410 while it is in a screen position associated with a desired selection or command. Thus, a clicking event is performed by momentarily extinguishing the radiation emissions of control object 410 during a definable range of duration which may be expressed in time, but is preferably expressed in a quantity of frames, which is preferably a user defined minimum quantity or range. Alternatively, the user inputs object selections and computer commands using one of the various selection or imitation mouse "click" commands described herein. According to one embodiment of the invention, the user inputs a mouse "click" by, for example, flashing control object 410 while maintaining control object 410 at an essentially constant position relative to camera 116. A momentary "click" has a definable range of duration which may be expressed in time, but is preferably expressed in a quantity of frames, which is preferably a user defined minimum quantity or range. Alternatively, the appearance of a second image in predetermined relationship to control object 410 and its subsequent disappearance after a predetermined finite number of consecutive frames indicates that a clicking event has occurred. According to other alternative embodiments, a clicking event is assumed if the cursor is stationary, or dwells, over an object for a predetermined quantity of frames, or a predetermined period of time as described in U.S. Pat. No. 4,891,630. After a clicking event has occurred, a message is transmitted informing the operating system of the clicking event.

The invention is ideally suited as a remote cursor control and selection device for interactive on-screen applications, for example, Microsoft Corporation's WEB TV™. As such, control object 410 is preferably integrated with a conventional TV remote control device. Such devices typically use one or more infrared LEDs outputting coded signals as a function of the user depressed key. The coded command signal is carried in the modulation of the signal. Thus, in a preferred embodiment, wand 420 is a TV remote that includes an additional control key 440 for activating control object 410. Until activated by initiation of a signal from control object 410, the screen cursor is inactive or hidden from view. Detection of an initial output signal identifying the position of control object 410 initiates display of the on-screen cursor, i.e., initial position information wakes the cursor from a sleep mode. User depression of key 440 continuously activates control object 410 and release deactivates it. Thus, all the functions of remote cursor control and selection system 400 of the invention are implemented in TV remote 420, including automatic centering on a TV screen (not shown) when light beam 430 is activated, cursor motion control by motion of TV remote 420 relative to camera 116; and selection when light beam 430 is extinguished, momentarily flashed, or otherwise modulated. Preferably, camera 116 is mounted in close proximity with the TV screen as either an integral or peripheral device whereby the user essentially points TV remote 420 at the TV screen to activate and control the cursor.

Furthermore, control of a cursor is not limited to a single user. Because light beam 430 is not restricted to appear originally at any particular location relative to sensor 120, but only within the field of view of camera 116, multiple control objects 410 are optionally individually illuminated and each controls the motion of the on-screen cursor and functions of control objects 410. Preferably, remote cursor control and selection system 400 responds to a first detected input beam 430 and ignores later detected beams 430' through 430$^N$, until first detected input beam 430 is extinguished.

Alternatively, multi-player games are supported by remote cursor control and selection system 400. In a multi-player game embodiment, remote cursor control and selection system 400 activates a first on-screen cursor and provides control of the first cursor to a first detected input beam 430. Additional on-screen cursors are activated upon detection of additional input beams 430' through 430$^N$, and control of each additional on-screen is provided to the beam 430 by which it is initiated. Each wand 420 optionally includes additional keys 440' through 440$^N$ for providing game command inputs, for example, via individual coded signals corresponding to different ones of additional keys 440' through 440$^N$.

Figure 11B:
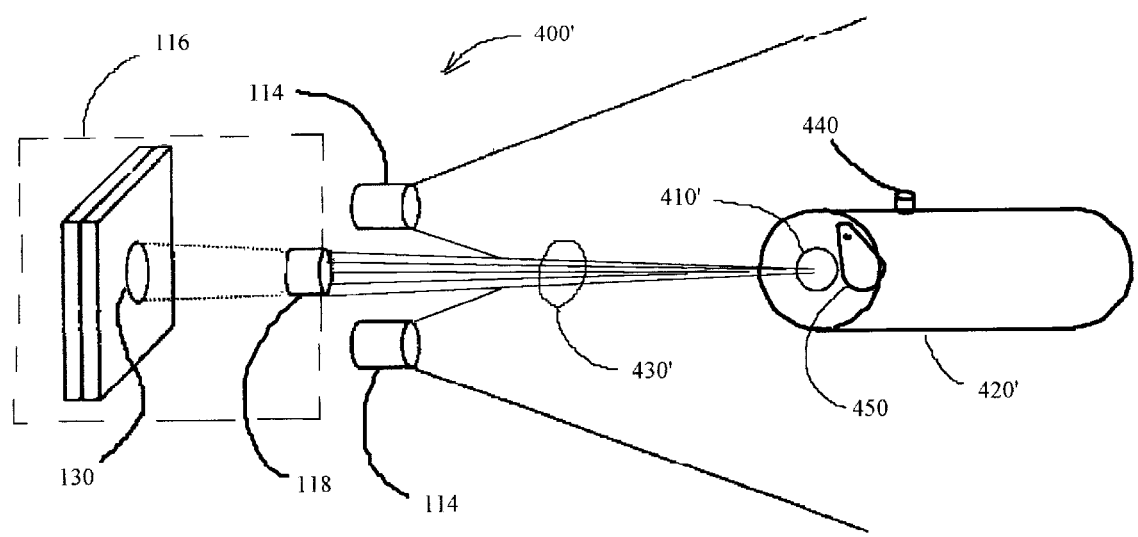
FIG. 11B illustrates another embodiment of remote "wand" cursor control and selection system of the present invention, wherein the control object is a passive target reflecting light emitted by one or more light sources.

FIG. 11B illustrates another embodiment 400' of remote cursor control and selection system 400, wherein control object 410' is a passive reflector and light beam 430' is generated by reflection of light emitted by one or more light sources 114. As described in connection with FIGS. 4, 5, and 6, light sources 114 are preferably infrared light sources essentially collocated with imaging lens 118 and directing electromagnetic radiation into the field of view camera 116. The functions associated with illumination of active control object 410 are similarly associated with illumination of passive reflective control object 410' by light sources 114 and subsequent imaging of reflective control object 410' onto sensor 120 by imaging lens 118. Control object 410' is preferably formed of a retroreflective material. Reflective control object 410' is normally inactive, i.e., hidden from light from sources 114 by an occlusion device 450. Reflective control object 410' is activated by exposing it to light from sources 114, reflective control object 410' remains exposed while engaged in moving the on-screen cursor. The light reflected by reflective control object 410' and imaged onto sensor 120 is effectively indistinguishable from the light originating from active control object 410, and camera 116 responds identically.

A clicking event is enacted by extinguishing light beam 430' by occluding reflective control object 410'. Alternatively, a clicking event is enacted by momentarily extinguishing and then reestablishing light beam 430' by occluding reflective control object 410' during a predetermined number of frames and then re-exposing it to light sources 114. Momentary occlusion is accomplished, for example, similarly to the flashing of a signal light by momentarily closing and reopening occluding flap 450 or the mechanically rotatable slats of a louvered shutter (not shown). Those of skill in the art will recognize that a such momentary occlusion of the reflective control object 410' is easily implemented in a large variety of configurations. Other examples (not shown) include dilating "camera" shutters, doors, retroreflector rotation, slides, electro-optical windows and other suitable occlusion devices.

Absolute Cursor Positioning

The present invention provides absolute cursor positioning calibration sequence that retains calibration even if there is no cursor control input for a period, such as when the head, eye, or finger pointing device of the invention is outside the field of view of the camera so that no control object is imaged onto the sensor. The user has the option of leaving the area for any period of time and resume working, without recalibrating: a given object position relative to the camera still positions the cursor at a specific location. This location is changed manually at the user's option. Preferably, one of keys 30 on keyboard 28 is designated to re-center cursor 24 relative to screen 22. For example, one of keys 102, 104 and 106 of "clicker" switch pad 36 is double clicked to re-center the cursor.

Figure 12:
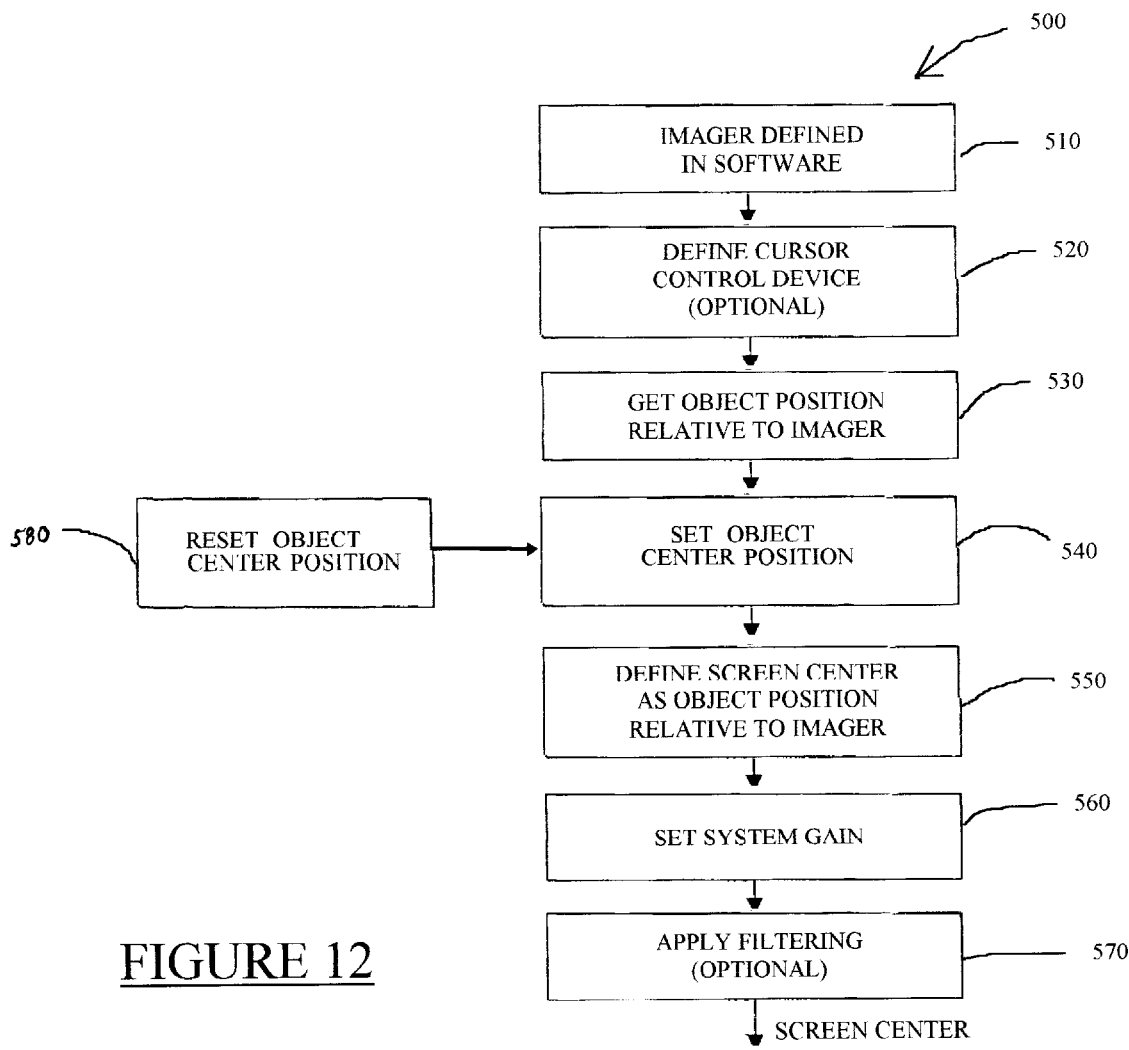
FIG. 12 flowcharts one embodiment of the software implementation of the absolute cursor positioning function of the present invention.

FIG. 12 flowcharts one embodiment of the software implementation of the absolute cursor positioning function 500 of the present invention. In Block 510, the imaging sensor, for example, CMOS sensor 120 (shown in FIG. 8) is defined using a predetermined sensor definition as an array of X pixels by Y pixels. In Block 520, the user optionally enters the name or type of cursor control device currently used. For example, the cursor control device is one of mouse 26, joystick 34, a digit on touchpad 32, an eye in one of the many oculometer eye tracking devices, the user's head or a head-mounted reflective object in a head tracking device, reflective object 112 in one of the finger pointing devices described herein, a remote wand cursor control and selection device 400 described herein, another of the various single or multiple target cursor control and selection devices described herein, or another suitable cursor control device. The device information is optionally used to define system gain and filtering, as discussed below.

When implemented in combination with a remote cursor control device, such as a hand-held or head-mounted cursor control device or one of the various cursor control devices disclosed herein, the physical position desired to be the screen center is selected by the user. As shown in Block 530, the cursor control object tracking device tracks the current position of the centroid of the target as a function, for example, of its image 130 on sensor 120, as shown in FIGS. 4, 5, 6.

In Block 540, the user determines a desired physical position for the active or passive device target, which defines the center of screen 22 (shown in FIG. 1). The user identifies the center position choice by any one of the various selection or "click" commands described herein, another dedicated function key of keyboard 28. According to one embodiment of the invention, the user indicates the physical position choice by, for example, pressing a specific one of keys 30 on computer keyboard 28. For example, one of keys 102, 104 and 106 of "clicker" switch pad 36 is double clicked to indicate the user's choice. In another example, the user's choice is indicated by depressing a predetermined one of the function keys on keyboard 28, or a predetermined combination or sequence of keys. Optionally, an audio or textual message is generated and respectively annunciated on system speaker (not shown) or displayed on the system display screen if the target object is not visible by not imaged onto the imaging sensor, for example, if the target is outside the field of view of the device camera.

As shown in Block 550, the user's input causes the invention to map the pixel of the imaging sensor containing the centroid of the target object to the center pixel of the screen. Thus, if the object is positioned relative to the field of view of the camera such that it is imaged on the center pixel of the imaging sensor (labeled X', Y' in FIG. 8), that center pixel of the imaging sensor is mapped to the center pixel of the screen. Alternatively, if as shown in FIG. 8, the centroid of the target object is positioned off the central axis of the camera's field of view and is imaged on another pixel (labeled X, Y in FIG. 8) of the imaging sensor, that off-center pixel of the imaging sensor is mapped to the center pixel of the screen.

In Block 560, the system gain is set. The absolute cursor positioning invention enlists a default setting in defining the relationship between the amount of spatial movement of the target relative to the sensor and the cursor movement on the screen. In a preferred embodiment, the invention installs a predetermined gain level as a function of the cursor control device, if defined in Block 520. The gain is a multiplication factor which determines how many screen pixels are traversed by the cursor for each image sensor pixel traversed by the target object. A high gain causes the cursor to traverse several screen pixels for each image sensor pixel traversed by the target object. A low gain requires the target object to traverse several image sensor pixels to cause the cursor to traverse a single screen pixel. However, in a practical embodiment, multiple screen pixels are traversed for each sensor pixel because the preferred CMOS sensor includes far fewer pixels than most display screens. The number of cursor pixels traversed relative to the number of sensor pixels is a function of the angular motion of the target object relative to the sensor. Therefore, when the target object is in close proximity to the sensor, a relatively small motion of the target object traverses a large number of sensor pixels and a low gain is used to control the motion of the cursor relative to the screen. Examples are the Finger Pointing Mode and Augmented Pointing Mode, as disclosed herein, where the target object 112 is close to camera 116 so that a very low gain causes relatively large motions of reflecting object 112 to cause cursor 24 to completely traverse display screen 22. In contrast, a wand control device, such as wand 400 disclosed herein, is intended for use at a distance from the sensor, and therefore, more extreme physical motion of the wand target object is a much lesser angular motion. A remote wand controller thus requires a higher gain to control the screen cursor. In another example, the slight motions of the head in a head tracking device require a high gain to move the cursor on the screen any significant distance.

As described in U.S. Pat. No. 4,891,630, left and right head rotation (rotation about the y axis in FIG. 8) is easier and more extreme for most users than rotation up and down (rotation about the x axis). Therefore, gain is optionally different for each of the x and y directions, i.e., higher gain for up and down motion and lower gain for side-to-side motion. The gain is optionally user selectable, whereby the user selects a different ratio of spatial movement to cursor movement. In other words, in a preferred embodiment, the user is able to limit the amount of target movement needed to move the cursor across the screen or expand the cursor's response to small target movements. A high ratio of target motion to cursor motion allows for very smooth cursor motion and accurate cursor positioning. A low ratio of target motion to cursor motion allows for rapid cursor repositioning. The ratio of target movement to cursor movement is preferably defined for a continuum between the two described extremes. In an embodiment wherein the user wears a head-mounted device, the user is able to adjust the "gain" of the cursor response to the target's spatial movement to move the cursor across the screen using only a small head movement or, in the alternative, to move the cursor only a relatively small incremental distance across the display screen using a large head movement. The ratio of head movement to cursor movement is preferably either infinitely adjustable along a continuum between these extremes or adjustable in predetermined steps.

According to another alternative embodiment, the invention optionally determines the number of imaging sensor pixels between the user-selected center pixel and the center pixel of the screen. The invention applies the current gain setting and computes the difference in pixels between the distance to the edge of the imaging sensor and the distance to the edge of the screen. If motion of the target object to an edge of the imaging sensor will not drive the cursor to the corresponding edge of the screen, an audio or textual message is generated and respectively annunciated on system speaker (not shown) or displayed on the system display screen, warning the user of the condition.

In Block 570, optional system filtering is added to smooth the motion of the target object as it is translated into motion of the cursor on the screen. According to one embodiment of the invention, the target object motion is averaged over predetermined time periods to smooth the cursor's on-screen motion. Optionally, a different predetermined default filtering period is applied as a function of the cursor control device, if defined in Block 520.

The cursor appears at the selected screen-center position and returns to this selected center position whenever the target object's reflection is at that spatial position relative to the imaging sensor position. If the target object leaves the field of view of the camera, the cursor again appears at the selected screen-center position when the target object's reflection is again positioned at the spatial position corresponding to the previously selected screen-center position.

Furthermore, as shown in Block 580, the user changes the spatial center position of the target object at any time by issuing the selection command while the target object is within the field of view of the camera. For example, by pushing the center selection key.

While the preferred embodiment of the invention has been illustrated and described, it will be appreciated that various changes can be made therein without departing from the spirit and scope of the invention.

What is claimed is:

1. An optical tracking device comprising:
   an optical sensor comprising a two-dimensional array of photosensitive pixels;
   an imaging lens in focused relationship with the optical sensor;
   a circuit for distinguishing a centroid of an optical image having an intensity above a threshold intensity, the distinguishing circuit being electrically coupled to convert the centroid of an optical image formed on the optical sensor and having an intensity above the threshold intensity into electrical video interface signals suitable for controlling the position of a cursor on a computer-controlled display as a function of the position of the centroid of the image relative to the optical sensor; and
   a clicking function implemented in software for operation on a processor, the clicking function generating a signal imitating a mouse click signal in response to a change in the quantity of images having an intensity above the threshold intensity.

2. The optical tracking device recited in claim 1, wherein one or more objects forming the image on the optical sensor comprise one or more digits of a user of the device positioned within the field of view of the imaging lens.

3. The optical tracking device recited in claim 2, further comprising an electromagnetic radiation source fixed in close proximity to the imaging lens and illuminating at least a portion of the field of view of the imaging lens, and
   wherein the one or more objects forming the image on the optical sensor are illuminated by the electromagnetic radiation.

4. The optical tracking device recited in claim 3, further comprising a reflector objects forming the image on the optical sensor.

5. The optical tracking device recited in claim 4, wherein the reflector object further comprises a retroreflector.

6. The optical tracking device recited in claim 3, wherein the imaging lens further comprises a single element aspheric camera lens.

7. The optical tracking device recited in claim 6, wherein the imaging lens further comprises a pin hole aperture in close proximity thereto.

8. The optical tracking device recited in claim 1, wherein the change in the quantity of images having an intensity above the threshold intensity further comprises the intensity of the control object image being less than the threshold intensity during a predetermined term and rising again above the threshold.

9. The optical tracking device recited in claim 1, wherein the change in the quantity of images having an intensity above the threshold intensity further comprises the momentary appearance of one or more additional object images having an intensity above the threshold in a position relative to the control object image.

10. The optical tracking device recited in claim 1, further comprising a calibration sequence function implemented in software for operation on a processor, the calibration sequence function determining a current position of the control object relative to the array of pixels of the optical sensor and mapping the pixel containing the centroid of the control object image to a pixel of the display screen.

11. The optical tracking device recited in claim 10, wherein the calibration sequence function maps the centroid of the control object image to a pixel located essentially at the center of the display screen.

12. The optical tracking device recited in claim 11, wherein the calibration sequence function further defines a relationship between the amount of spatial movement of the control object relative to the optical sensor and the cursor motion on the display screen.

13. An optical tracking device comprising:
   an optical sensor comprising a two-dimensional array of photosensitive pixels;
   an imaging lens in focused relationship with the optical sensor;
   a circuit for distinguishing a centroid of an optical image having an intensity above a threshold intensity, the distinguishing circuit comprising:
     signal thresholds for distinguishing images having an intensity above the threshold intensity,
     circuitry for determining connectivity between the pixels determined to have an intensity above the threshold intensity and for determining which of the pixels having an intensity above the threshold intensity are further connected to form an object image,
     circuitry for determining a centroid of each object image, and
     circuitry for generating output signals representative of the position of the centroid of each object image relative to the array of photosensitive pixels of the optical sensor, and
   wherein one or more objects forming the image on the optical sensor comprise one or more digits of a user of the device positioned within the field of view of the imaging lens,
   the distinguishing circuit being electrically coupled to convert the centroid of an optical image formed on the optical sensor and having an intensity above the threshold intensity into electrical video interface signals suitable for controlling the position of a cursor on a computer-controlled display as a function of the position of the centroid of the image relative to the optical sensor;
   a signal processing function implemented in software for operation on a processor, the signal processing function coupled to receive the output signals representative of the position of the centroid of each object image relative to the array of photosensitive pixels of the optical sensor and determine one control object image among one or more of the object images by distinguishing one or more candidate control object images from one or more other object images as a function of the output of one or more elimination algorithms;

a cursor motion control function implemented in software for operation on a processor, the cursor motion control function responsive to an output signal of the signal processing function representative of the position of the centroid of the control object image relative to the array of photosensitive pixels of the optical sensor for controlling a position of a cursor relative to a display screen; and a clicking function implemented in software for operation on a processor, the clicking function generating a signal imitating a mouse click signal responsively to a change in the image, the change in the image comprising a change in the quantity of images having an intensity above the threshold intensity.

14. The optical tracking device recited in claim 13, wherein determining one control object image among one or more of the object images further comprises determining the control object image as a function of the physical arrangement of the one or more user digits relative to the field of view of the imaging lens.

15. The optical tracking device recited in claim 15, wherein determining the control object image as a function of the physical arrangement of the one or more user digits relative to the field of view of the imaging lens further comprises identifying one of the object images appearing closest to an edge of the optical sensor.

16. The optical tracking device recited in claim 13, wherein the change in the quantity of images having an intensity above the threshold intensity further comprises the intensity of the control object image being less than the threshold intensity during a predetermined term and rising again above the threshold.

17. The optical tracking device recited in claim 16, wherein the intensity of the control object image being less than the threshold intensity during a predetermined term and rising again above the threshold further comprises the control object image being in essentially the same position relative to the optical sensor upon rising again above the threshold after the predetermined term as before being less than the threshold intensity.

18. The optical tracking device recited in claim 13, wherein the change in the quantity of images having an intensity above the threshold intensity further comprises the momentary appearance of one or more additional object images having an intensity above the threshold in a position relative to the control object image.

19. The optical tracking device recited in claim 13, further comprising a calibration sequence function implemented in software for operation on a processor, the calibration sequence function determining a current position of the control object relative to the array of pixels of the optical sensor and mapping the pixel containing the centroid of the control object image to a pixel of the display screen.

20. The optical tracking device recited in claim 19, wherein the calibration sequence function maps the centroid of the control object image to a pixel located essentially at the center of the display screen.

21. The optical tracking device recited in claim 20, wherein the calibration sequence function further defines a relationship between the amount of spatial movement of the control object relative to the optical sensor and the cursor motion on the display screen.

22. The optical tracking device recited in claim 21, wherein the relationship between the amount of spatial movement of the control object relative to the optical sensor and the cursor motion on the display screen is defined by a default setting in the implementation software.

23. The optical tracking device recited in claim 21, wherein the calibration sequence function is further responsive to an input signal indicating an instant at which to determine the current position of the control object relative to the optical sensor.

24. The optical tracking device recited in claim 13, further comprising a cursor control object positioned within a field of view of the imaging lens, the cursor control object comprising:
a housing,
a source of electromagnetic radiation positioned within the housing
a power supply, and
a switch for coupling the power supply to the radiation source.

25. The optical tracking device recited in claim 13, further comprising an electromagnetic radiation source fixed in close proximity to the imaging lens and illuminating at least a portion of the field of view of the imaging lens, and
wherein the one or more objects forming the image on the optical sensor are illuminated by the electromagnetic radiation.

26. The optical tracking device recited in claim 25, further comprising a reflector objects forming the image on the optical sensor.

27. The optical tracking device recited in claim 26, wherein the reflector object further comprises a retroreflector.

28. The optical tracking device recited in claim 25, wherein the imaging lens further comprises a single element aspheric camera lens.

29. The optical tracking device recited in claim 28, wherein the imaging lens further comprises a pin hole aperture in close proximity thereto.

30. An optical tracking device comprising:
an optical sensor comprising a two-dimensional array of photosensitive pixels,
an imaging lens in focused relationship with the optical sensor, and
a circuit for distinguishing a centroid of an optical image having an intensity above a threshold intensity, the distinguishing circuit being electrically coupled to convert the centroid of an optical image formed on the optical sensor by an electromagnetic radiation source positioned within the field of view of and remotely from the imaging lens and having an intensity above the threshold intensity into electrical video interface signals suitable for controlling the position of a cursor on a computer-controlled display as a function of the position of the centroid of the image relative to the optical sensor, the distinguishing circuit comprising circuitry for determining an object image formed by one or more the pixels having an intensity above the threshold intensity;
a centering function implemented in software for operation on a processor, the centering function determining a current position of the object image relative to the array of pixels of the optical sensor and mapping the pixel containing a centroid of the object image to a pixel at the approximate center of the display screen;
a cursor motion control function implemented in software for operation on a processor, the cursor motion control function responsive to an output signal of the centering function representative of the position of the centroid of the object image relative to the array of photosensitive pixels of the optical sensor for controlling a position of a cursor relative to the display screen;

a clicking function implemented in software for operation on a processor, the clicking function generating a signal imitating a mouse click signal responsively to a reduction in the intensity of the object image.

31. An optical device for tracking a remote object, the device comprising:

an optical sensor formed of a plurality of photosensitive pixels arraigned in a two-dimensional array;

an infrared radiation source essentially collocated with the imaging lens and directing infrared radiation into at least a portion of the field of view of the imaging lens;

an imaging lens arranged to image onto the optical sensor a cursor control object comprising a portion of a digit of the hand of a user of the device, the digit including a reflection augmenting device positioned within the field of view and the depth of field of the imaging lens, the cursor control object illuminated by the infrared radiation and having an image intensity above a minimum threshold intensity wherein only an image formed by infrared radiation reflected from the illuminated cursor control object has an intensity in excess of the minimum threshold intensity, and the imaging lens imaging infrared radiation reflected from the illuminated cursor control object;

an interface circuit coupled to the optical sensor for:
  distinguishing a centroid of the cursor control object image,
  determining a position of the centroid of the cursor control object image relative to the two-dimensional array of pixels, and
  producing cursor control signals suitable for controlling the position of a cursor on a computer-controlled display as a function of the centroid of the control object image position information, the interface circuit having one or more filters implementing signal thresholds for distinguishing object images that have an intensity above a threshold intensity, the one or more filters comprising:
  circuitry implementing a function for determining connectivity between different ones of the pixels that are determined to have an intensity above the threshold intensity,
  circuitry implementing a function for determining which of the pixels having an intensity above the threshold intensity are further connected to others of the pixels to form an object image
  circuitry implementing a function for determining a centroid of each object image, and
  circuitry implementing a function for generating output signals representative of the position of the centroid of each object image relative to the optical sensor; and a clicking function implemented in software for operation on a processor coupled to receive the cursor control signals, the clicking function generating a signal imitating a mouse click signal responsively to a momentary change in the quantity of object images having an intensity in excess of the minimum threshold intensity.

32. The optical device recited in claim 31, further comprising a signal processing function implemented in software for operation on a processor, the signal processing function coupled to receive the output signals representative of the position of the centroid of each object image relative to the array of photosensitive pixels of the optical sensor and determining one control object image among one or more of the object images.

33. The optical device recited in claim 32, wherein determining one control object image among one or more of the object images further comprises determining the control object image as a function of the physical arrangement relative to the field of view of the imaging lens of the one or more user digits including a reflection augmenting device.

34. The optical device recited in claim 33, wherein determining the control object image as a function of the physical arrangement of the one or more user digits relative to the field of view of the imaging lens further comprises identifying one of the object images appearing closest to an edge of the optical sensor.

35. The optical tracking device recited in claim 31, wherein the reflection augmenting device further comprises a device formed of a retroreflective material.

36. The optical tracking device recited in claim 31, wherein the momentary change in the quantity of object images having an intensity in excess of the minimum threshold intensity further comprises a momentary reduction in the intensity of the control object image to less than the minimum threshold intensity before a resumption of intensity above the threshold while the control object image retains an essentially constant position relative to the optical sensor.

37. A device for remote control of a display screen cursor, the device comprising:
  a) a camera comprising:
    i) a solid state image sensor comprising a two-dimensional array of light sensitive memory cells arranged in a plurality of rows and columns, each cell being accessible for reading, the output upon reading any cell being a function of the light intensity thereupon relative to a threshold,
    ii) a lens fixed relative to the image sensor focusing a light image of a reflective cursor control object on the cells thereof,
    iii) an interface circuit coupled to the image sensor producing electronic video signals suitable for controlling the position of a cursor on a computer-controlled display as a function of the position relative to the image sensor a centroid of a control object image having an intensity above the threshold;
  b) one or more electromagnetic infrared radiation sources essentially collocated with the lens and illuminating objects positioned within the field of view of the lens;
  c) a hand-operable reflective cursor control object formed of a retroreflective material and positionable within the field of view of the lens and reflecting illumination from the one or more electromagnetic radiation sources toward the lens; and
  d) a clicking function implemented in software for operation on a processor, the clicking function coupled to receive an output of the camera and generating an output signal imitating a mouse click signal responsively to a change in the cursor control object image, the change in the cursor control object image further comprising a change in the intensity of the cursor control object image to a level less than the threshold intensity level during a term and a subsequent change in the intensity level of the cursor control object image to a level greater than the threshold intensity level at substantially the same position relative to the optical sensor.

38. A method for tracking a remote object to control the position of a cursor on a computer-controlled display as a function of the position of a control object, the method comprising:

illuminating a hand-operable reflective cursor control object with one or more electromagnetic radiation sources;

reflecting illumination from the one or more electromagnetic radiation sources illuminating the reflective cursor control object;

imaging the radiation reflected by the reflective cursor control object onto an optical sensor formed of a two-dimensional array of radiation sensitive pixels arranged in a plurality of rows and columns, distinguishing on the optical sensor a radiation image of the reflective cursor control object having an intensity above a threshold intensity;

distinguishing a centroid of the radiation image;

determining a position of the centroid of the radiation image relative to the two-dimensional array of pixels;

producing electronic video signals suitable for controlling the position of a cursor on a computer-controlled display as a function of the position of the centroid of the radiation image relative to the two-dimensional array of pixels, and generating a change in the radiation image by reducing the image intensity below the threshold and subsequently increasing the image intensity above the threshold.

39. The method of claim 38 wherein generating a change in the radiation image further comprises reducing the image intensity below the threshold and subsequently increasing the image intensity above the threshold while retaining substantially the same image position relative to the two-dimensional array of pixels.

* * * * *